United States Patent [19]
Nilsen et al.

[11] Patent Number: 5,987,306
[45] Date of Patent: Nov. 16, 1999

[54] SYSTEM FOR MONITORING TELEPHONE NETWORKS AND/OR DATA COMMUNICATION NETWORKS, ESPECIALLY MOBILE TELEPHONE NETWORKS

[75] Inventors: Arild Nilsen; Rune Berntzen, both of Oslo, Norway

[73] Assignee: Telefonaktiebolaget L M Ericsson, Stockholm, Sweden

[21] Appl. No.: 08/750,336

[22] PCT Filed: May 31, 1995

[86] PCT No.: PCT/NO95/00086

§ 371 Date: Apr. 8, 1997

§ 102(e) Date: Apr. 8, 1997

[87] PCT Pub. No.: WO95/33352

PCT Pub. Date: Dec. 7, 1995

[30] Foreign Application Priority Data

Jun. 1, 1994 [NO] Norway ................................. 942031

[51] Int. Cl.⁶ .................................................. H04Q 7/34
[52] U.S. Cl. ............................................ 455/67.1; 455/423
[58] Field of Search .................................. 455/67.1, 67.4, 455/67.3, 67.7, 446, 448, 424, 425, 423, 226.1; 370/338; 379/32, 27, 29, 22; 371/5.1, 5.2, 20.4, 27.1

[56] References Cited

U.S. PATENT DOCUMENTS

| | | |
|---|---|---|
| 5,023,900 | 6/1991 | Tayloe et al. ........................... 455/424 |
| 5,297,193 | 3/1994 | Bouix et al. ........................... 455/424 |
| 5,410,753 | 4/1995 | Szabo ......................................... 455/88 |
| 5,471,649 | 11/1995 | Rees et al. ............................. 455/67.4 |
| 5,542,120 | 7/1996 | Smith et al. .......................... 455/67.1 |
| 5,561,839 | 10/1996 | Osterberg et al. ..................... 455/446 |
| 5,610,910 | 3/1997 | Focsaneanu et al. .................. 370/351 |
| 5,706,333 | 1/1998 | Grenning et al. ..................... 455/67.1 |
| 5,710,978 | 1/1998 | Swift ..................................... 455/67.1 |
| 5,719,563 | 2/1998 | Thompson, Jr. ...................... 455/67.1 |
| 5,734,696 | 3/1998 | Day ....................................... 455/67.1 |
| 5,768,689 | 6/1998 | Borg ...................................... 455/67.4 |

FOREIGN PATENT DOCUMENTS

| | | | |
|---|---|---|---|
| 0431956 A2 | 12/1990 | European Pat. Off. | ......... H04Q 7/04 |
| WO 91/15904 A1 | 10/1991 | WIPO | ........................... H04B 17/00 |
| WO 93/15569 A1 | 8/1993 | WIPO | ........................... H04B 17/00 |
| WO 93/15591 A1 | 8/1993 | WIPO | ........................... H04Q 7/04 |

*Primary Examiner*—Dwayne D. Bost
*Assistant Examiner*—Jean A. Gelin
*Attorney, Agent, or Firm*—Jenkens & Gilchrist, P.C.

[57] ABSTRACT

A system and method monitors telephone networks and/or data communication networks, especially cellular mobile telephone networks (CeN), and provides good evidence of performance and quality of the services to be delivered by the network. At the same time, the system and method is easy to handle and includes components that require only small spaces and that are effective in use. According to the invention, a method and system (CeNA) includes one or more fixed and/or mobile units (FTU, MTU), herein designated as field units or test units, that enable quality observations and communication with a network operator or operation center (CU).

18 Claims, 20 Drawing Sheets

Measure Setup

Measurement order ID
Measurement order # 2

Fixed Test Unit
Faaberg FTU # 1

Mobile Test Units

| | |
|---|---|
| mtu103 | Bislett |
| mtu104 | Bislett |
| mtu105 | Bislett |
| mtu106 | Bislett |
| mtu106 | Bislett |
| mtu107 | Bislett |

Mode
● Add   ○ Browse

GPS filter
2 D navigation

Geographic Area
Bislett
Bygd0
Center
E6_Lillehammer
Lillehammer
Neuss
Nord

FIG. 4A

Timing hh : mm : ss

Start @ 03:00:00

Stop @ 17:00:00

Interval 09:00:00

Duration 00:25:00

Close

Measurement Qual

☒ Call on interval

☐ Call when in area

☐ Call on trig

Run Parameters

☐ Idle time RF measurements

☒ Keep data on TX failure

☒ Reject on no GPS coverage

Triggers (0 = any)

BSiC 0    ARFCN 0

Accept    Delete

FIG. 4B

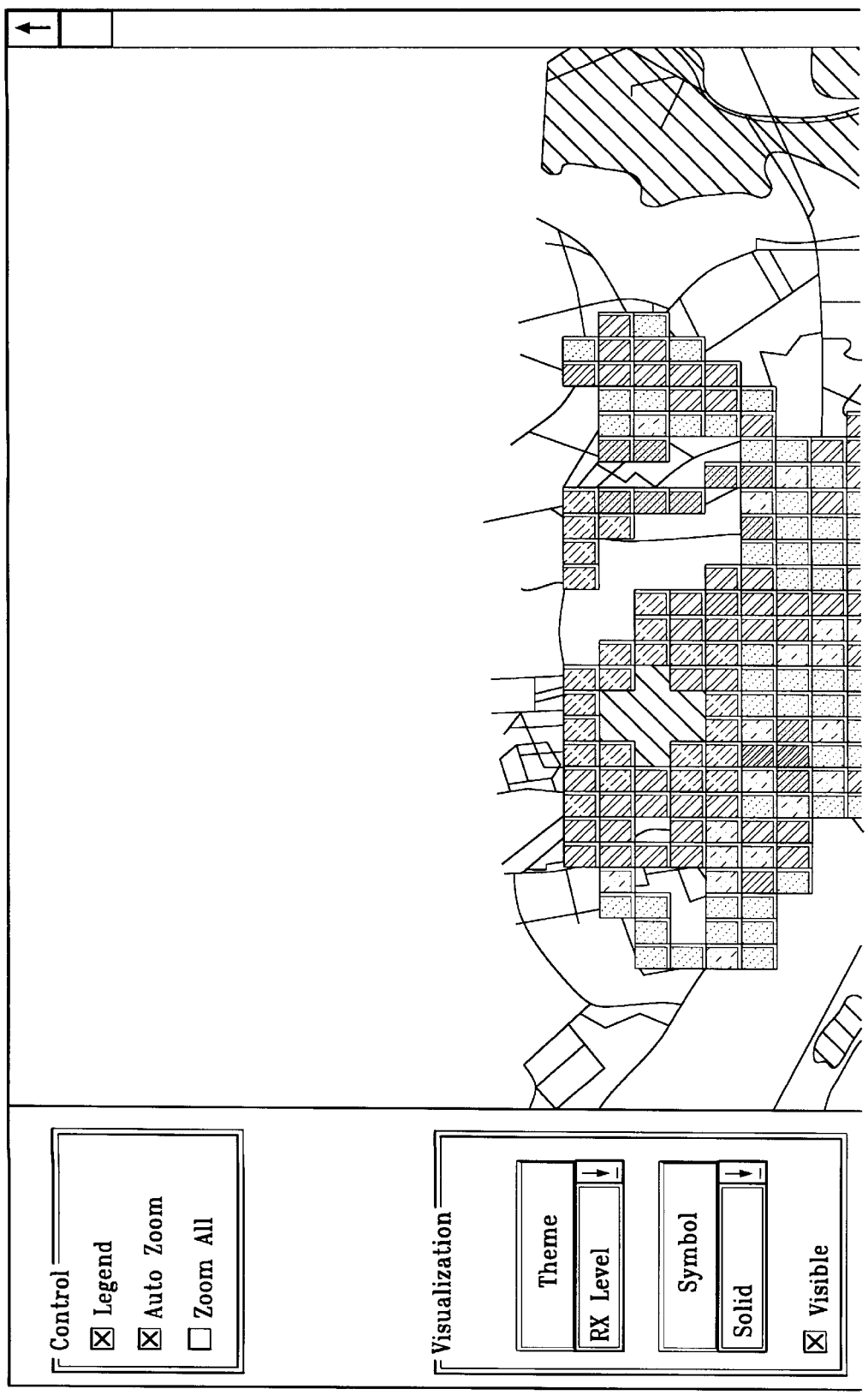

| | Parcel | RxQMean | RxLMean | TxPMean | ResMean | Conv# | BSiC | RFCI | CSR |
|---|---|---|---|---|---|---|---|---|---|
| 695 | 86046 | 0.00 | −81.55 | 5.45 | 0.00 | 1 | 0 | 0 | 0.00 |
| 696 | 86047 | 0.00 | −76.71 | 7.57 | 0.00 | 1 | 0 | 0 | 0.00 |
| 697 | 86048 | 0.00 | −77.88 | 7.38 | 0.00 | 1 | 0 | 0 | 0.00 |
| 698 | 86049 | 0.00 | −76.00 | 11.00 | 0.00 | 1 | 0 | 0 | 0.00 |
| 699 | 86050 | 0.00 | −73.67 | 11.00 | 0.00 | 1 | 0 | 0 | 0.00 |
| 700 | 86051 | 0.00 | −46.25 | 15.00 | 0.00 | 1 | 0 | 0 | 0.00 |
| 701 | 86052 | 0.00 | −62.50 | 8.50 | 0.00 | 1 | 0 | 0 | 0.00 |
| 702 | 86053 | 1.72 | −80.91 | 7.02 | 0.00 | 1 | 0 | 0 | 0.00 |
| 703 | 86054 | 4.00 | −84.50 | 5.00 | 0.00 | 1 | 0 | 0 | 0.00 |
| 704 | 86055 | 0.40 | −55.98 | 12.80 | 6.50 | 1 | 0 | 0 | 100.00 |
| 705 | 86056 | 0.21 | −58.92 | 13.41 | 0.00 | 1 | 0 | 0 | 0.00 |
| 706 | 86057 | 0.07 | −73.36 | 10.86 | 6.00 | 1 | 0 | 0 | 100.00 |
| 707 | 86058 | 0.17 | −73.83 | 11.67 | 6.50 | 1 | 0 | 0 | 100.00 |
| 708 | 86059 | 0.33 | −72.23 | 9.44 | 6.50 | 1 | 0 | 0 | 100.00 |
| 709 | 86060 | 0.23 | −65.94 | 10.97 | 7.00 | 1 | 0 | 0 | 100.00 |
| 710 | 86061 | 0.62 | −67.31 | 11.00 | 0.00 | 1 | 0 | 0 | 0.00 |
| 711 | 86062 | 0.00 | −42.50 | 15.00 | 0.00 | 1 | 0 | 0 | 0.00 |
| 712 | 86063 | 0.55 | −82.00 | 7.18 | 0.00 | 1 | 0 | 0 | 0.00 |
| 713 | 86064 | 0.24 | −83.00 | 7.24 | 0.00 | 1 | 0 | 0 | 0.00 |

Identify measurement location

FIG. 6

Rx Level

| | |
|---|---|
| ▨ | $-54 \leq X \leq -10$ |
| ▨ | $-62 \leq X < -54$ |
| ▨ | $-70 \leq X < -62$ |
| ▨ | $-78 \leq X < -70$ |
| ▨ | $-86 \leq X < -78$ |
| ▨ | $-94 \leq X < -86$ |
| ▨ | $-102 \leq X < -94$ |
| ▨ | $-110 \leq X < -102$ |

—>— Connect

Handover

Handover Failure

Blocked Call

Dropped Call

Handovers

| AREA NAME | Data Sum of ATTEMPTS | HO, Succ. Ratio |
|---|---|---|
| Bislett | 36 | 100.00 % |
| Nord | 246 | 100.00 % |
| Sorost | 706 | 99.96 % |
| Sentrum | 1630 | 95.62 % |
| StHaugen | 47 | 96.52 % |
| Vest | 1294 | 96.99 % |

PARCEL (All)

FIG. 10A

SYSTEM FOR MONITORING TELEPHONE NETWORKS AND/OR DATA COMMUNICATION NETWORKS, ESPECIALLY MOBILE TELEPHONE NETWORKS

THE SCOPE OF THE INVENTION

The present invention relates to a system for monitoring telephone networks and/or telecommunication networks, in particular cellular telephone networks.

THE BACKGROUND TO THE INVENTION

The rapid, world-wide expansion in cellular networks combined with keener competition among network operators, has meant an ever increasing need for continuous improvement as to quality and accessibility of networks as stated.

Where the network operator is concerned, higher quality and better accessibility must be obtained while at the same time prices of calls and other services should be kept as low as possible. Subscribers expect the operator of the cellular network to be able to offer services of a high quality at a price comparable to that of fixed installed networks.

To meet these requirements, the applicant has developed a system for monitoring cellular networks as stated, namely a system comprising an operator's tool for testing, verification, planning and maintenance, as well as continuous inspection and monitoring of cellular networks With this system, the operator will be able to verify his planning and restructuring of cells for expanding and enhancing the network, to detect problems in existing networks as seen from the subscriber's point of view, and with speed and efficiency take steps to resolve any problem as stated. Because the system comprises manageable electronic data, it will be possible for the operator to obtain statistical lists to be used in analysing the quality of the network, and also to obtain at desired points in the network and at any time, a clear picture of the immediate and future measures which need to be implemented in order to maintain an optimal network.

THE AIMS OF THE INVENTION

One aim of the present invention is to describe a system which may be designed and configured for simple installation and operation while at the same time procuring objective observations of the performance in the network concerned and thus information to the network operator concerning the service provided through the network.

A further aim of the invention is to provide a system whereby the operator may in a simple manner set the requisite control parameters, and a system which, once the parameters and operating commands have been set, more or less operates without supervision.

Another aim of the invention is to describe a system which may be built on a modular basis, thus permitting simple extension of the system when the network(s) concerned grows larger, whether relating to analogous and/or digital standards.

Yet a further aim of the invention is to describe a system designed in such a way as to allow the processed data to provide information in relevant and easily readable formats, e.g. for printed reports and suitable statistics.

One more aim of the invention is to describe a system where the operator may evaluate the performance statistics relative to random points in the network, or study in detail the network performance as experienced by a user.

SUMMARY OF THE INVENTION

These aims are achieved according to the invention by a system of the nature described initially, which is characterised in that it comprises one or several fixed and mobile units, referred to here as field units or test units, the said units containing quality observing organs which communicate with an operator of the network, in particular an operator for a cellular mobile network.

The most important components which are part of the system according to the invention thus comprise a mobile test unit (MTU) and a fixed test unit (FTU), the mobile test unit preferably being designed as an autonomous module, capable of receiving orders from and supply results to a fixed unit. The mobile unit may be programmed or ordered to carry out quality observations comprising the radio signal level on one or several defined channels, signalling of decoding, calculations of bit error rate, performing analogous measurings, both "down-link" and "up-link", and log position information.

Results observed by the mobile unit will suitably be reported back to the fixed unit for accumulation of statistics, and the mobile unit may suitably comprise a micro processor and be placed in a suitable vessel/vehicle.

The fixed unit which communicates with the mobile unit may constitute the operator's point of access to the system as to specification of parameters, definition of tasks, presentation of status of service, and ordering of presentations of results.

The fixed unit (FTU) receives calls from the mobile unit (MTU) and represents the fixed end of a call. Logging will also take place here.

In addition, the system comprises an operations centre (CU) which constitutes a collective concept for a number of units and enables communication between the said field units (FTU, MTU) and the operator or the user of the system.

This operations centre allows communication not merely between the said field units in the relevant cellular telephone network but also communication between databases via e.g. one or several open data networks.

An operations centre may suitably comprise a frontal unit (FE) which defines the interface for operating and defining the actual system, a database management system (DBMS), a main server (CeNAS) which takes care of the exchange of data between the database management system and the said field units (FTU/MTU), a configuration station (CS) which defines the interface for maintenance of data and system resources, and a presentation station (PS) with the task of presenting the relevant data/measurements.

Appropriately, a central unit as stated may comprise software to handle operator communication and system operation, generating of digital maps as well as presentation of results.

Further advantages and features of the present invention will become evident from the description below taken in conjunction with the attached drawings, and the patent claims attached.

BRIEF DESCRIPTION OF THE FIGURE IN THE DRAWINGS

Figure 3A:
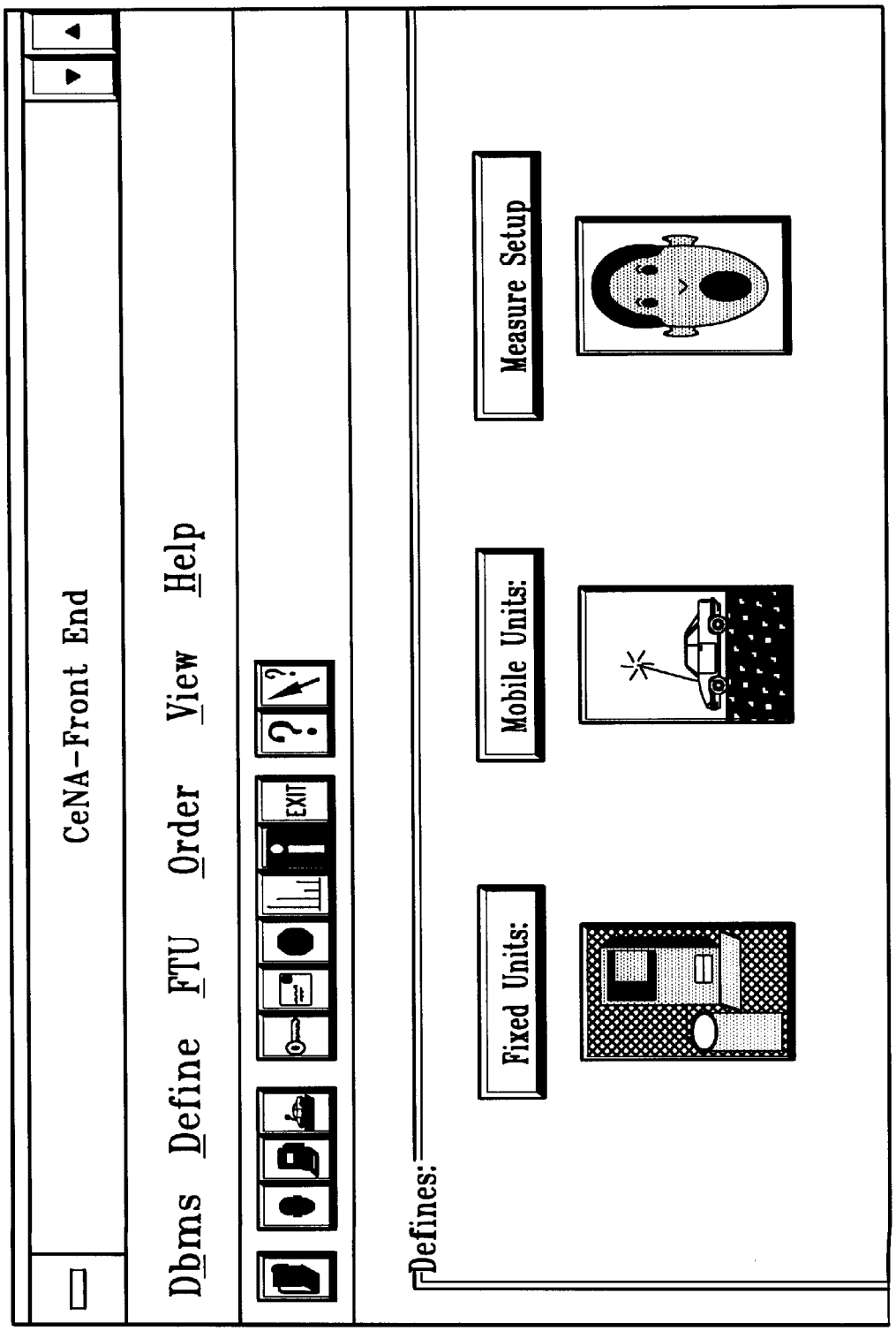
Figure 3B:
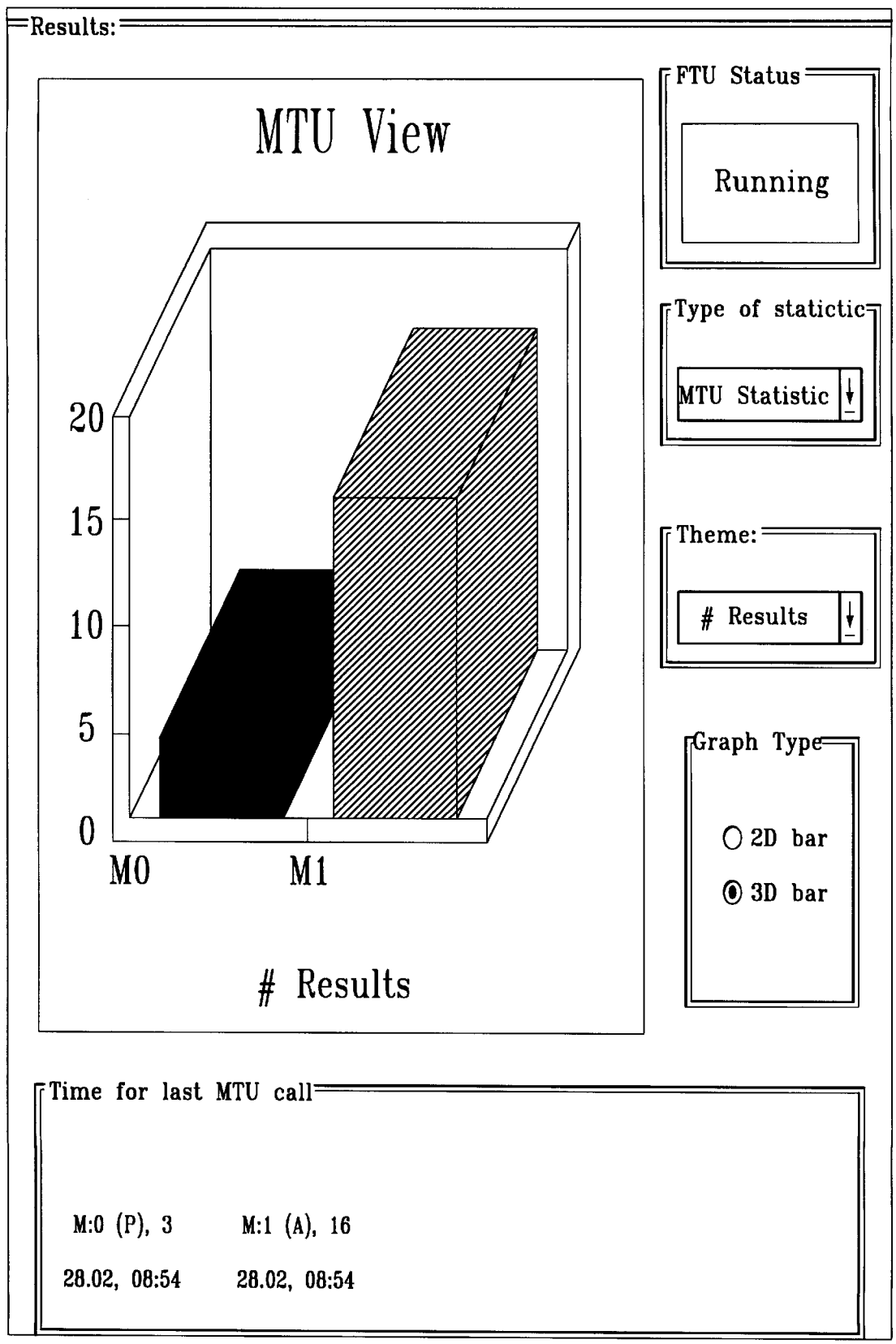

FIGS. 3A and 3B together show another interaction image which may appear on creation of system functions, in particular when the frontal unit (FE) is being used.

FIGS. 4A and 4B together show yet another interaction image which may be used in setting parameters in the system.

Figure 5A:
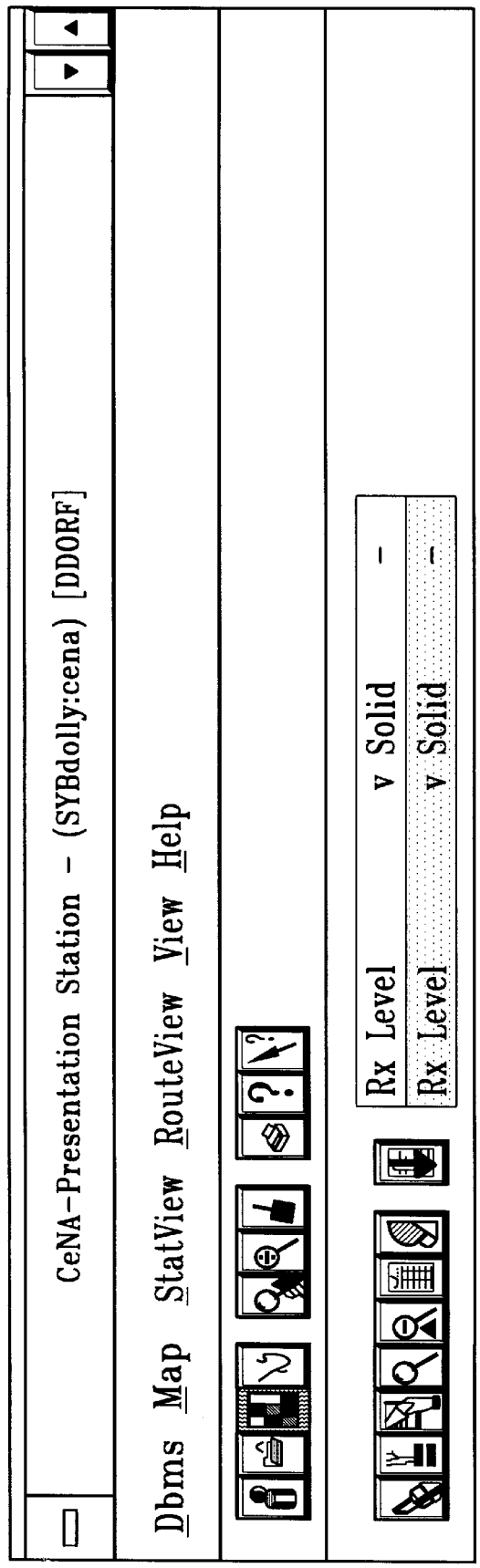
Figure 5C:
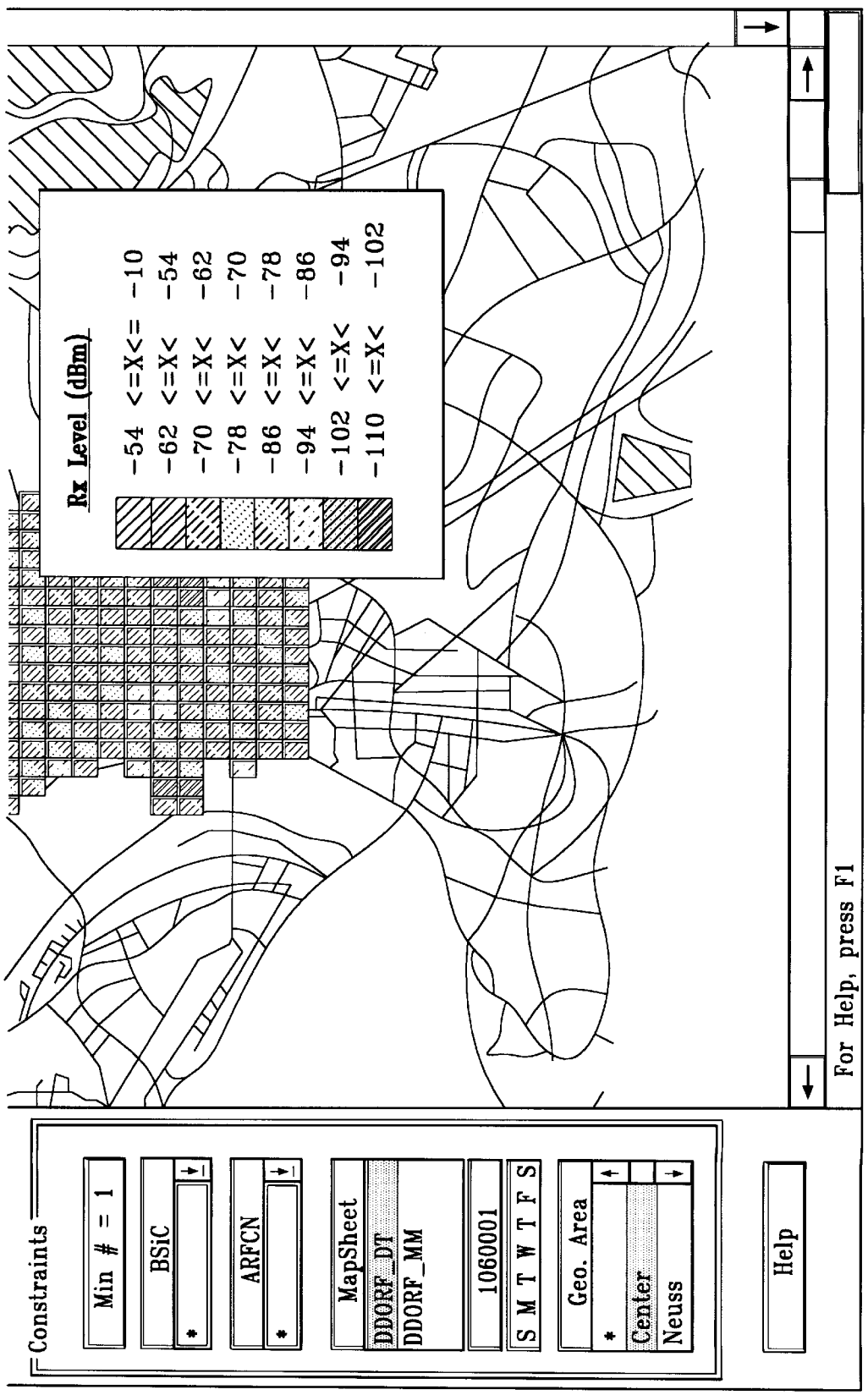

FIGS. 5A, 5B and 5C are together a screen image of a geographical area where certain statistically related data have been plotted.

FIG. 6 is a screen image showing statistical tables of certain logged observations of quality.

Figure 7A:
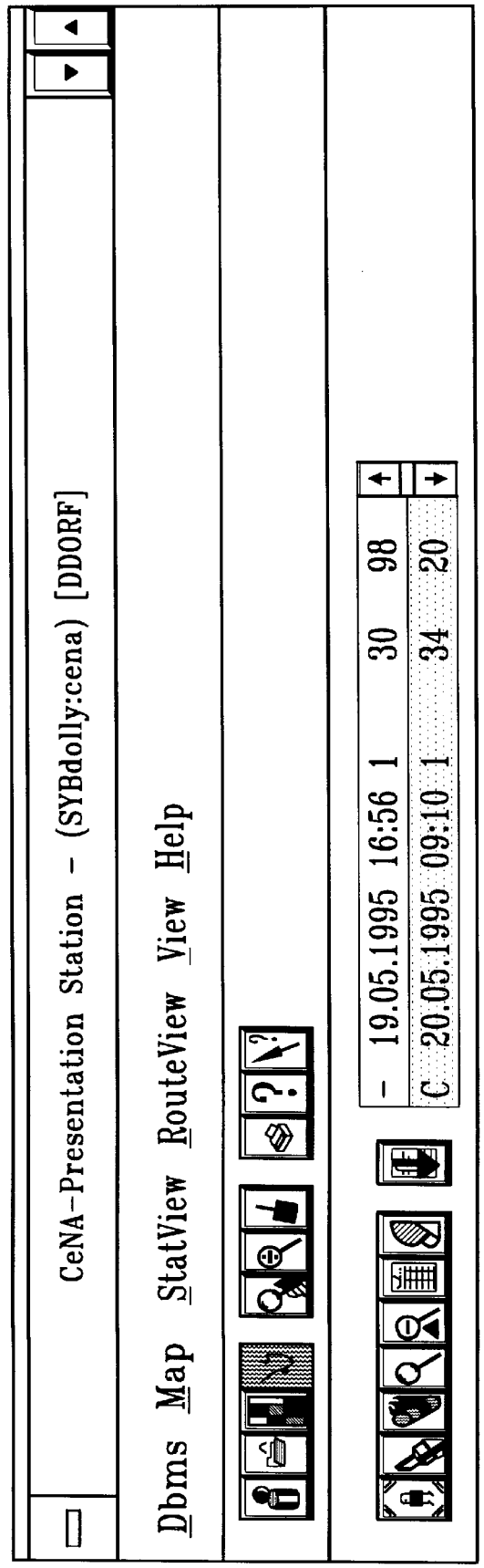
Figure 7B:
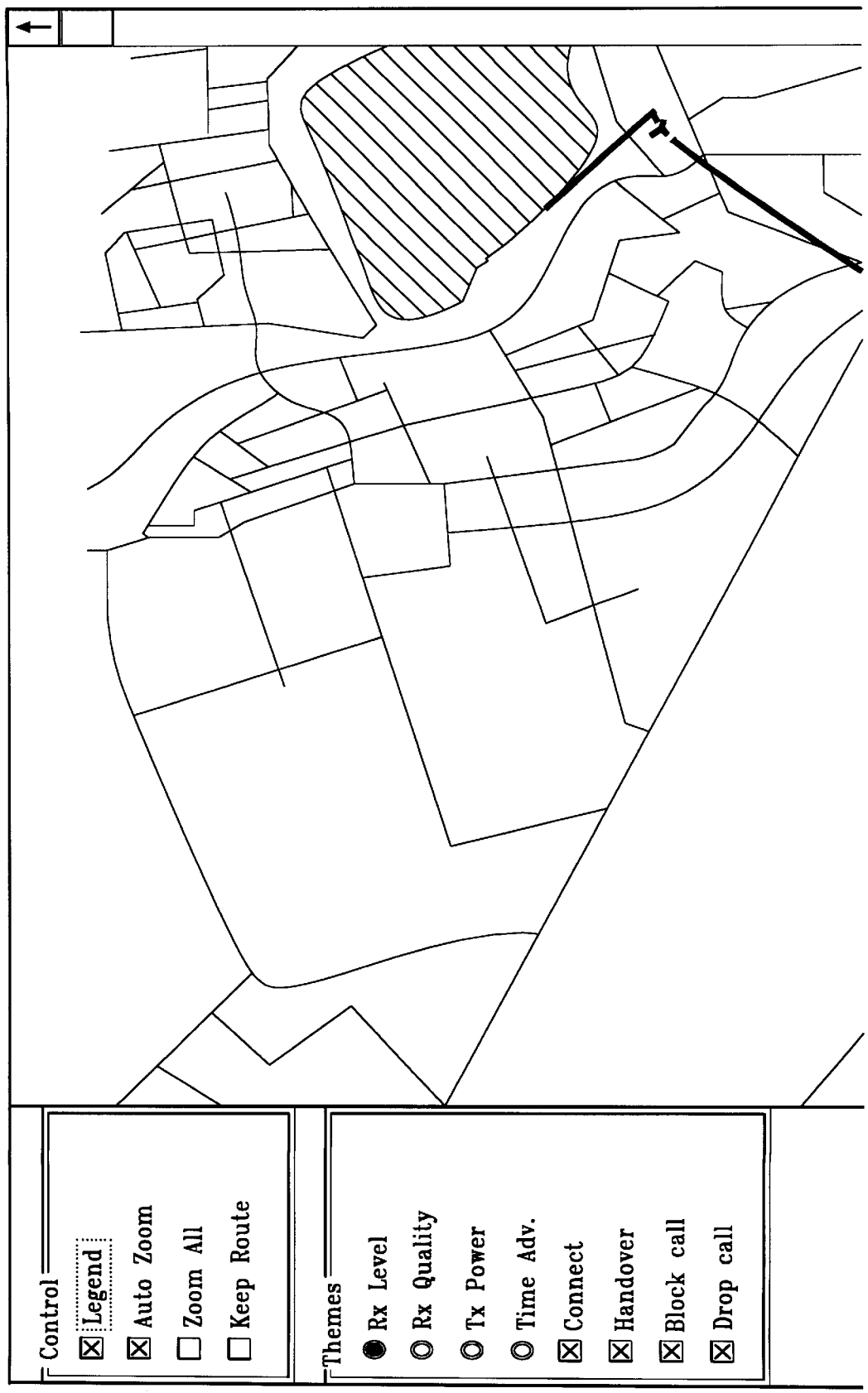
Figure 7C:
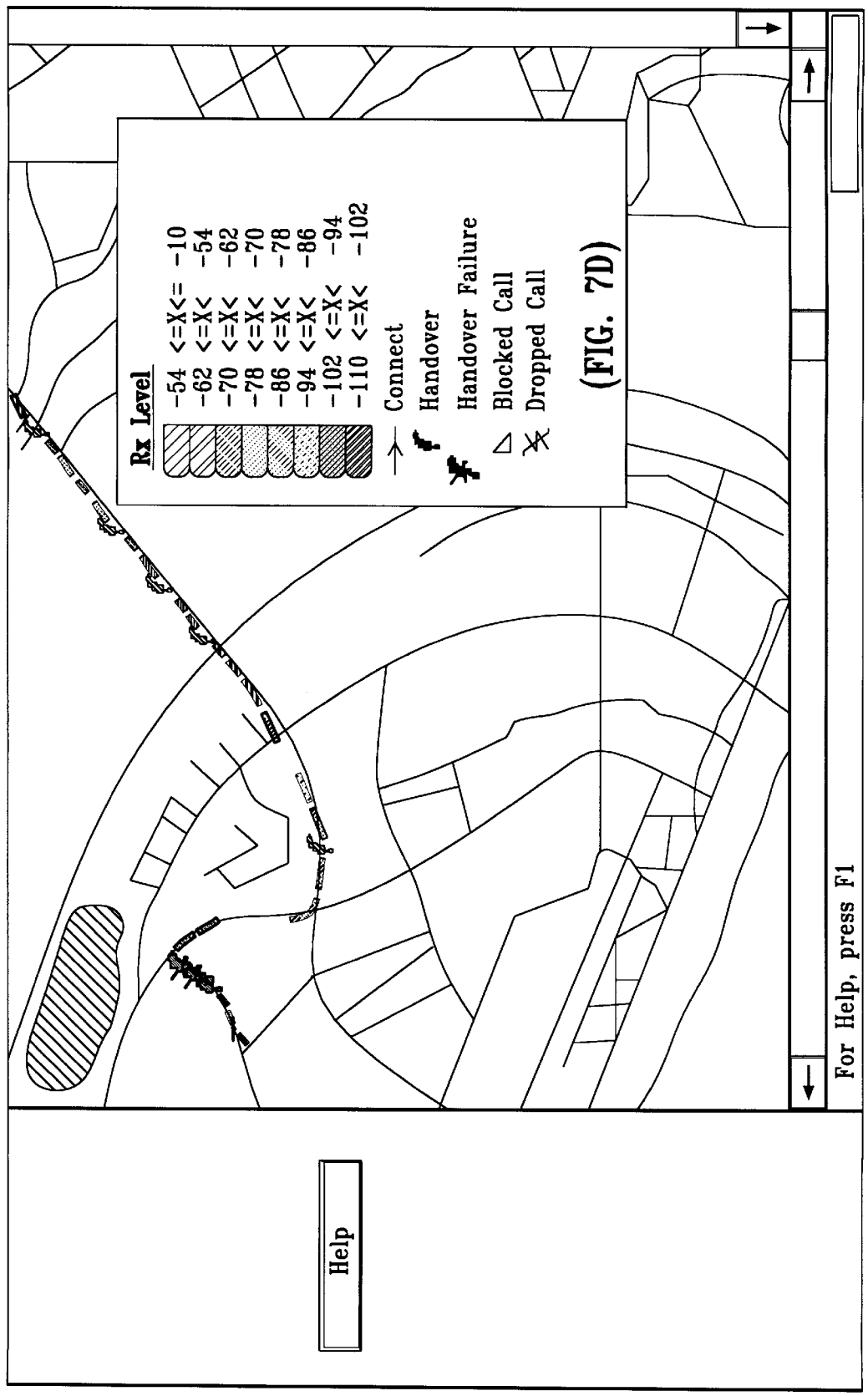
Figure 7D:
Figure 7D:
Figure 7D:
Figure 7D:

FIGS. 7A, 7B and 7C together show a screen image of a routing overview for a mobile conversation, while FIG. 7D is in larger scale one part of FIG. 7C.

Figure 8A:
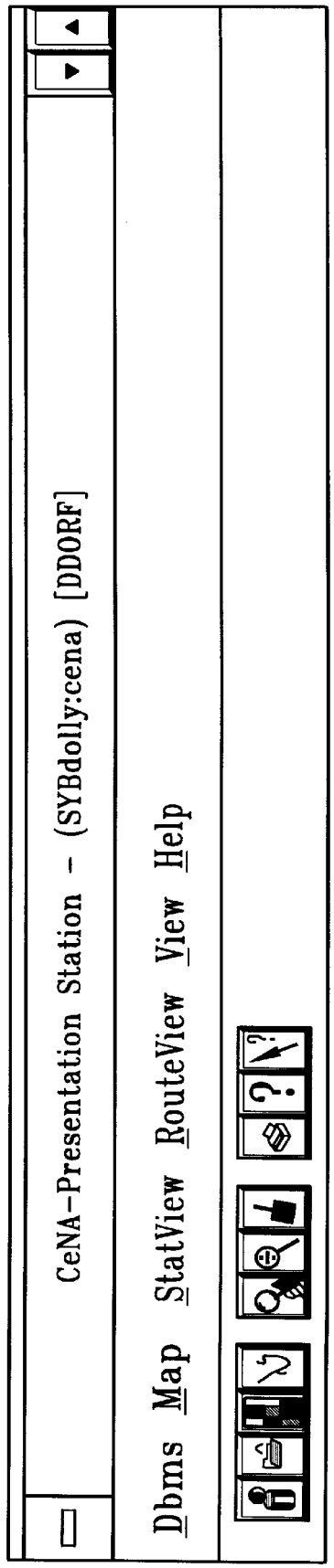
Figure 8B:
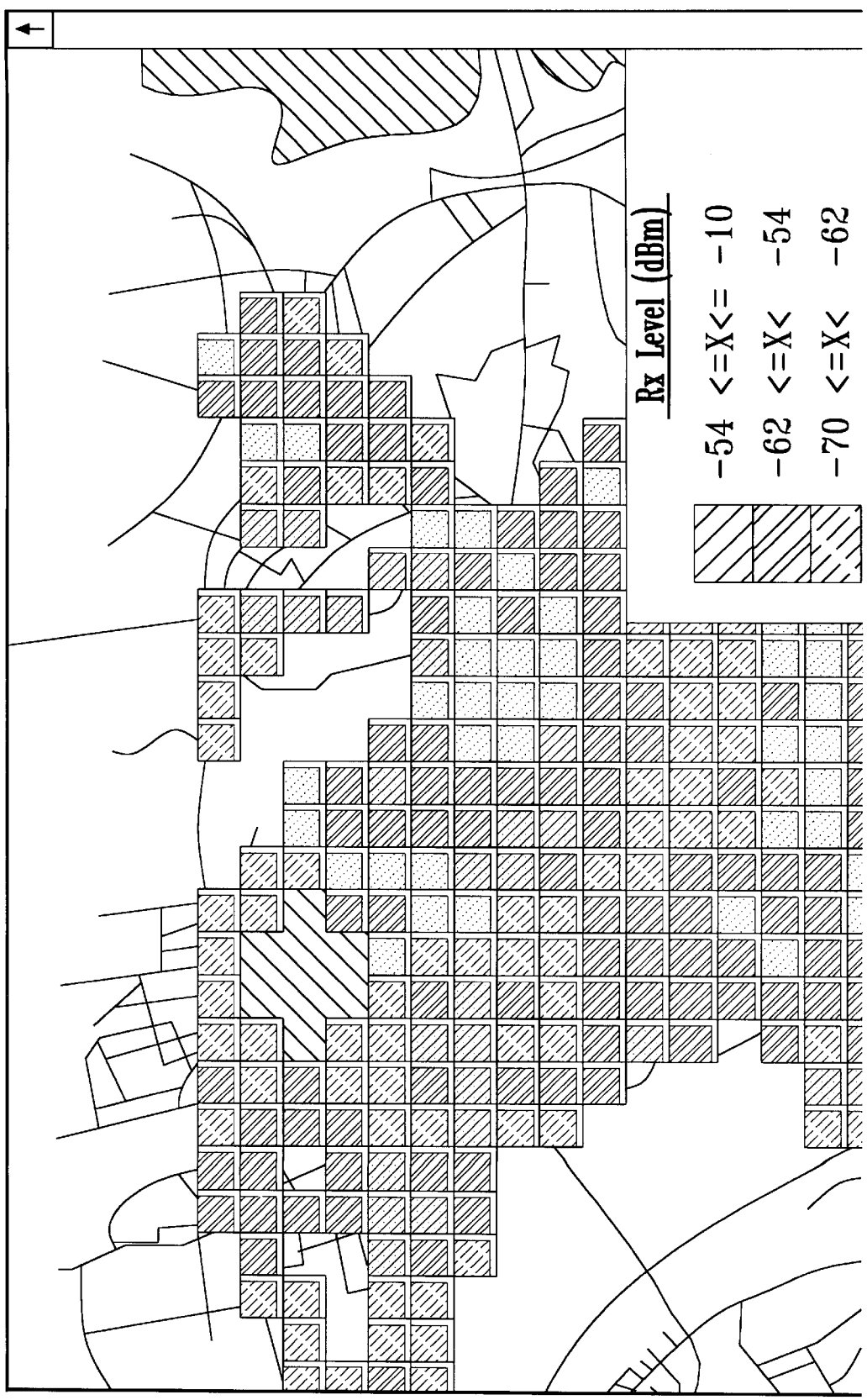
Figure 8C:
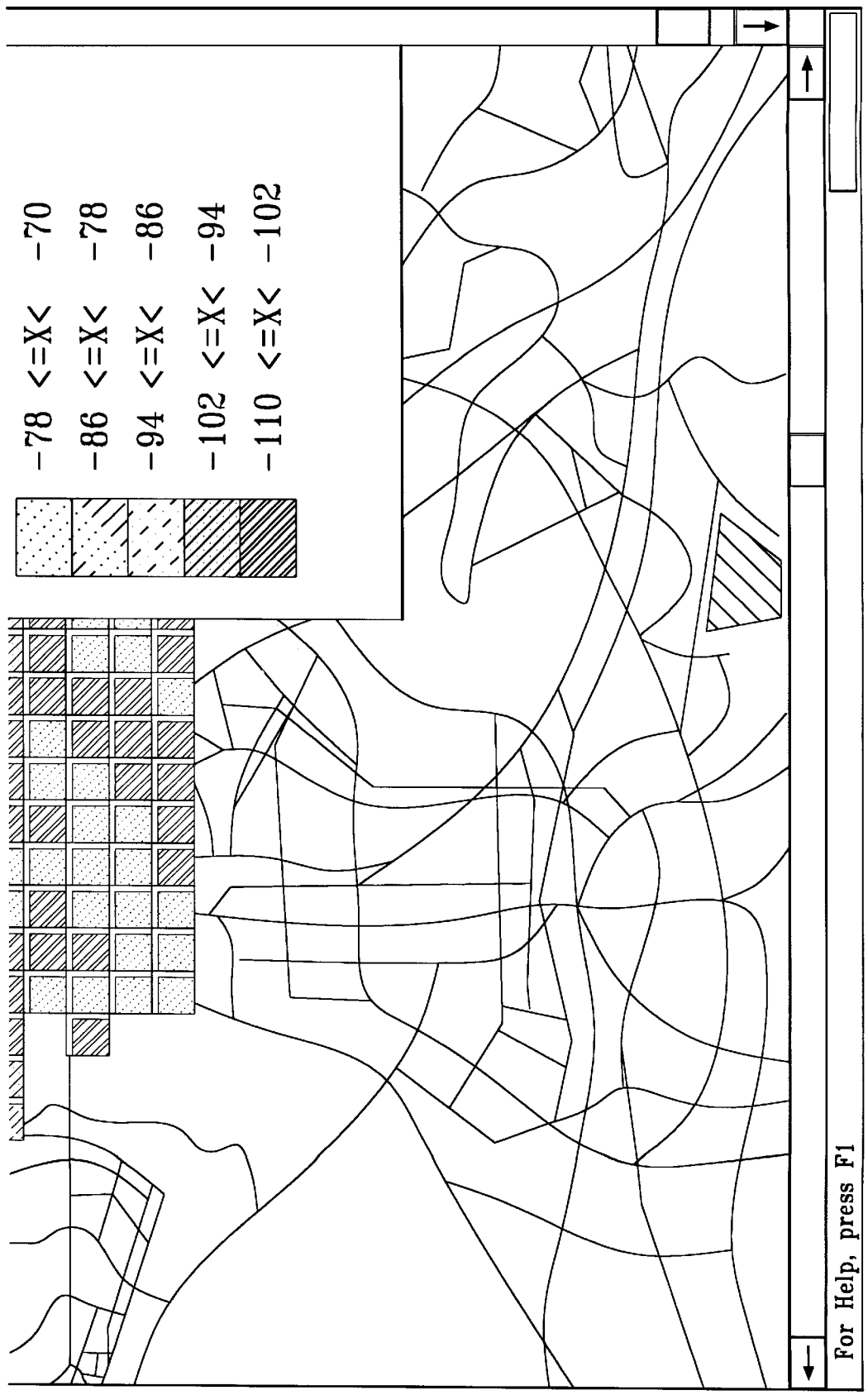

FIGS. 8A, 8B and 8C are together a screen image similar to FIG. 5, where is shown in larger scale a statistical map overview of accumulated measurements.

Figure 9:
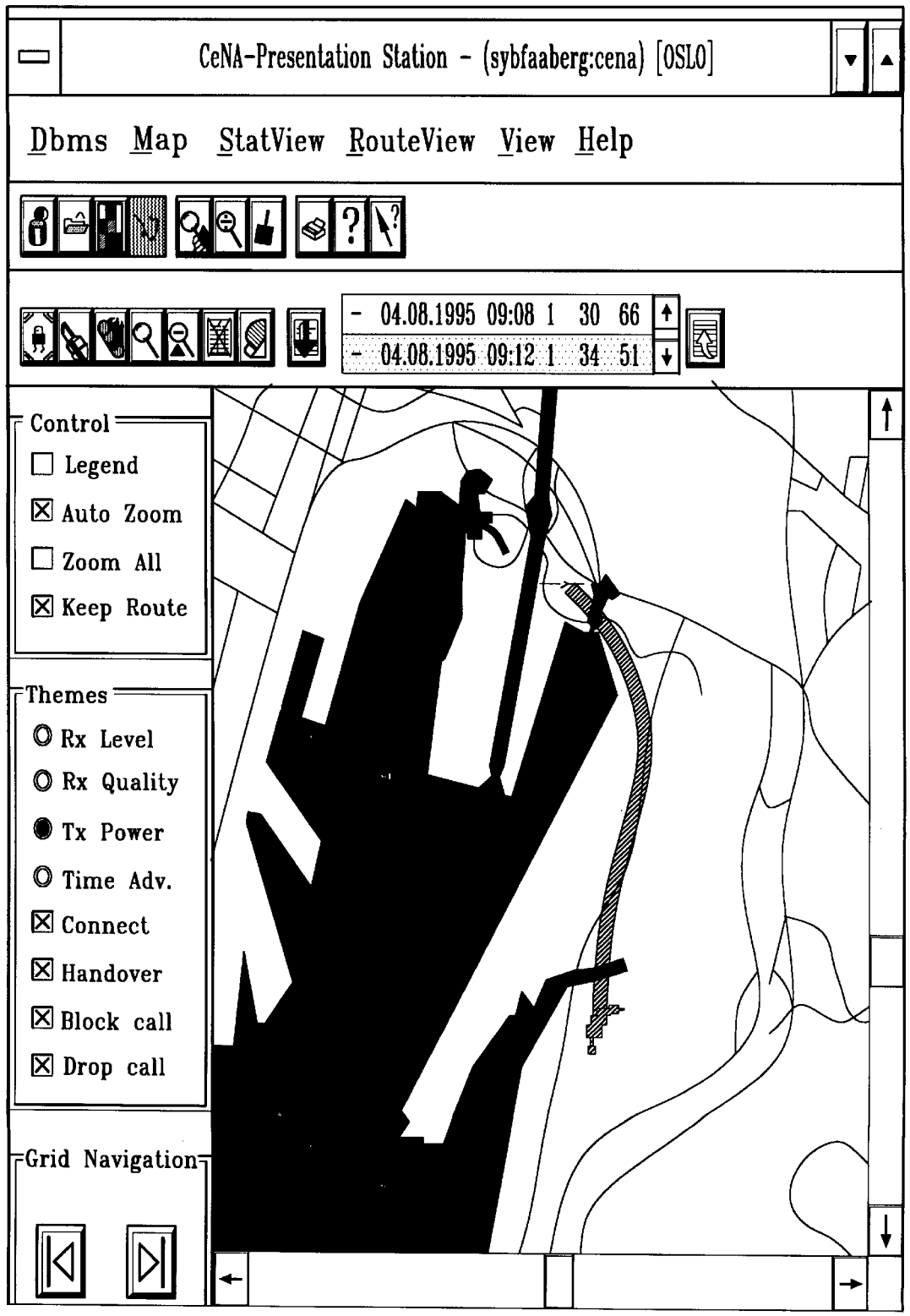

FIG. 9 is a screen image similar to FIGS. 7A–7D where a map overview shows the quality of a conversation for a mobile unit along one particular route.

Figure 10B:
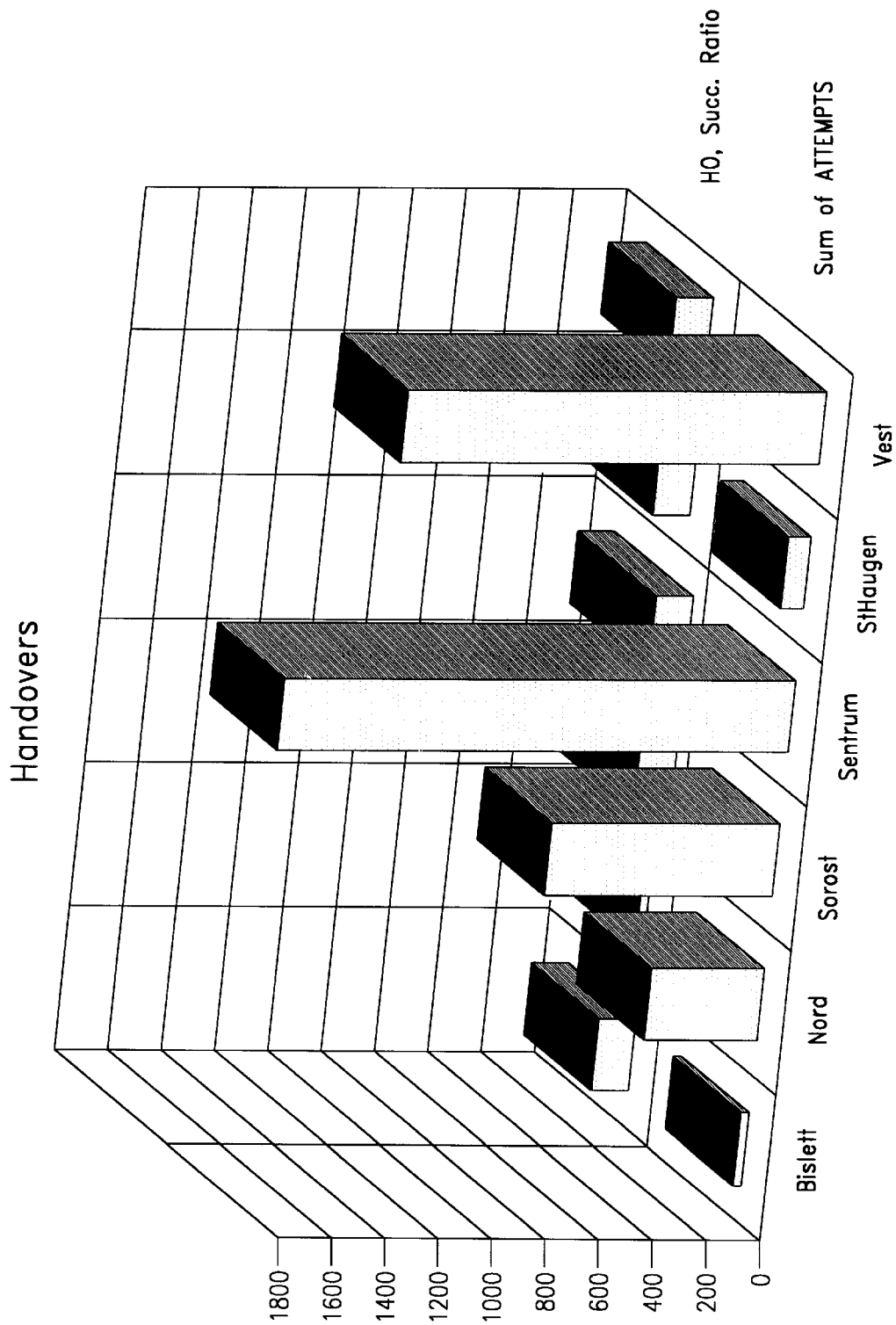

FIGS. 10A and 10B are together a screen image which shows statistics presented as bar charts.

DESCRIPTION OF EMBODIMENTS

Figure 1:
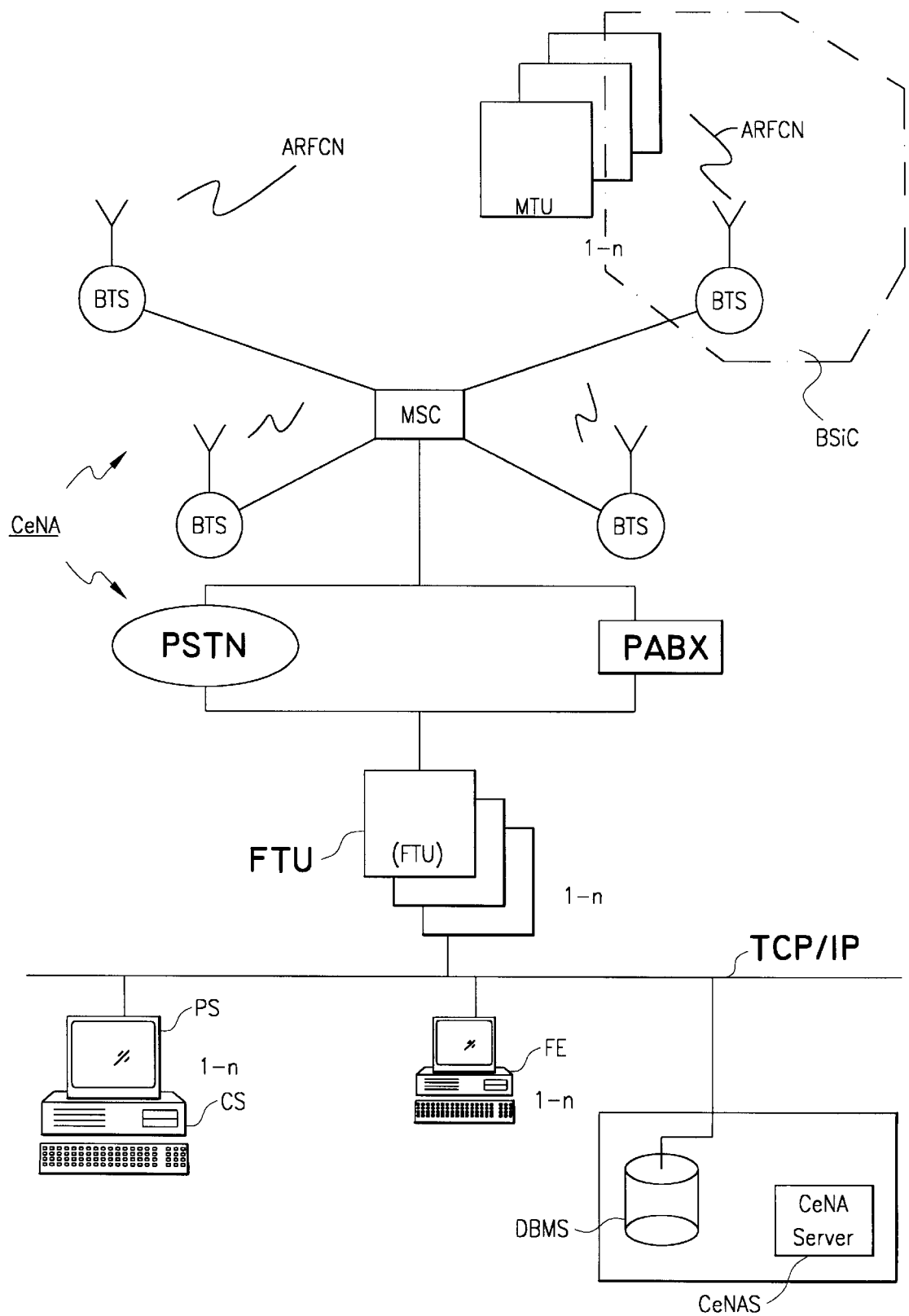
FIG. 1 is a block chart showing an example of interaction between a cellular mobile network (CeN) and a permanent network (PSTN) comprising components which may bring the present invention to fulfilment.

In FIG. 1 is shown schematically an outline of the system according to the invention, referred to here as CeNA which could also be described as a cellular network analysis system. The cellular mobile network is referred to in FIG. 1 as CeN, and this network communicates with a permanent network, PSTN, which in turn, and via a multitude of fixed test units FTU communicates with an operations centre CU.

The system CeNA comprises a set of tools for the cellular operator and is used continually for monitoring the quality of services in the network concerned, in particular the cellular mobile telephone network CeN. In principle, the system aims to represent the subscribers' perception of the quality of the services in the network.

To attempt to achieve maximal performance, the system builds on the following criteria:

To carry out volume measurements in the network concerned, the said measurements being made by means of, on the one hand, fixed units, referred to here as fixated test units, FTU, and, on the other hand, mobile units, referred to here as mobile test units, MTU. The fixed test units FTU which may comprise a multitude of such units, may be spread out geographically, while the mobile test units MTU, which may also be arbitrary in number, are preferably fitted into vessels/vehicles with random or determined routes in the specific network CeN to be monitored.

User-friendly surroundings for positioning and maintenance, in particular with regard to the operator interface relative to the operations centre CU, from where random fixed test units FTU and mobile test units MTU can be configures and controlled, placing and maintenance being capable of being divided, while at the same time levels of access may be allocated according to the wish of the operator. The operations centre CU with its components thus has user-friendly surroundings which means that the whole system may be governed from just one geographical location, since the stationary and mobile test units do not need to have an operator's interface Unattended operation is aimed for after a system configuration has been defined and system orders received and carried out, because the system components are then capable of making unattended observation measurements of quality, and perform collecting, storing and more or less complete processing of collected data, while at the same time real time communication of the results and pertaining storage ensure immediate access to the measured results.

Storage of results based on an open database system allowing easy access to and exchange of information, while at the same time an open database architecture also affords the user the option of using the information in his own application and in connection with other information from the same or from other open database systems.

Standardised communication protocols between system components entail communication via the same open network. e.g. TCP/IP which means flexible configuration and distribution of system components, with exceptions for communication between the fixed test units FTU and the mobile test units MTU which employ a mobile data communication link and the permanent network PSTN.

Flexible configuration for easy adaptation to varying and growing demand is achieved by using the data network as a link between system components, adaptation to various configurations, as well as a complete overview of the development potential.

Diverse and powerful visualisation of the results focusing both on detailed and statistical presentations, with most of the presentations building on the use of a geographical information system which enables the operator or the user to assess the results relative to their factual surroundings in the geographical position concerned. The presentation of the results may also comprise means for generating statistical reports, and all the presentation tools may be based on industrial, standardised tools components and formats, thus allowing easy export of the information to other applications.

In summary, a system as shown in FIG. 1 could make it possible for the operator in a straightforward manner to configure and maintain measuring nodes, to carry out and to store field measurings with a minimal number of components and also to utilise the collected data for orderly presentation and analysis as well as for easy distribution of reports and results to other users in the organisation concerned.

A closer inspection of FIG. 1 will reveal that the said CeNA system may comprise a multitude of components which constitute the complete system according to the invention, namely for ordering, collecting, storage, administration and presentation of the observations of quality which are made in the cellular mobile telephone network which is to be monitored.

According to an appropriate embodiment of the invention, a so-called front end FE is used which could be described as the interface for the operator or the user of the system in managing the components which are part of a CeNA system. The main tasks carried out by the front end FE, include definition of system components, ordering of measurings and monitoring system performance.

By means of or from the front end FE, the user may set parameters for any of the previously mentioned fixed test units FTU and mobile test units MTU, and also issue orders concerning measurings for the said and other components which are defined in the system. The said front end FE may be called up from any work station in the connected data network. Access to the various system components may be defined and restricted according to the operator's needs, and password protection may be used. This permits a flexible set-up with regard to definitions of orders for measurings and distributed maintenance of the CeNA system(s) concerned. All definitions in the system and set-up of orders are retained in a so-called database management system DBMS, allowing the user with ease to retrieve and/or modify existing definitions. The said front end FE also provides functions for monitoring activities in the CeNA system, both with regard to immediate situations and collected statistical data concerning such activities. The front end FE may suitably be implemented in a standard Windows configuration and utilise the data network for access to a server CeNAS for the said cellular network monitoring system CeNA, and the said database management system DBMS.

The said server CeNAS has as its task to relay measurement orders from the database management system DBMS to the flexible test units FTU, as well as the measuring results from the said flexible test units FTU to the database management system DBMS. The results may comprise data from observations of quality from the fixed test unit FTU concerned, or comprise results received by the latter from relevant mobile test units MTU for storage in the database management system DBMS.

Moreover, the server CeNAS has as its task to keep statistics of the use of the system, comprising statistics of activities for the said mobile test units MTU and fixed test units FTU, and to pre-process the measuring results for statistical information with the emphasis on performance and with subsequent presentation in mind.

In other words, the server CeNAS constitutes a central part for the said CeNA system and may for instance be implemented in a UNIX configuration, the server generally residing in the same computer as the one comprising the server platform for the database management system DBMS. It should be understood that the server communicates with the fixed test units FTU via the network mentioned previously, TCP/IP. As mentioned above, each of the fixed test units FTU is employed in announcing calls via the network PSTN to the individual mobile test units MTU and to answer calls from the said mobile test units MTU in the mobile network CeN. The fixed test units FTU thus have as their task to relay calls to selected mobile test units MTU and thereby communicate measurement orders, to evaluate their own measuring orders with regard to the time for calling mobile test units, to initiate calls to mobile test units MTU in the mobile network CeN, and also to measure selected parameters for originating calls, and, finally, to answer calls from mobile test units MTU and to receive observations of quality from there.

The fixed test units FTU may suitably be implemented as free-standing units, and all control of the fixed test units will, in the embodiment shown, be exercised from the front end FE. With a given configuration, one or each of the flexible test units FTU will be able to serve from 1 to 20 PSTN lines, while at the same time each of the fixed test units may be distributed in a suitable geographical pattern, and also communicate with the mobile test units MTU via the said mobile network CeN, as well as with the server CeNAS via the data network TCP/IP.

Each of the mobile test units MTU performs all the said observations of field or quality in the relevant mobile network. In other words, it is the task of the mobile test units to:

receive measurement orders from fixed test units FTU,
answer calls from the fixed test units FTU,
evaluate measurement orders and take action accordingly,
make calls to the fixed test units FTU,
take measurements in the mobile network concerned, including logging of a multitude of parameters,
position relate and time stamp all measurements made,
communicate measurement results to fixed test units FTU The mobile test units MTU mentioned will originate and answer calls in the mobile network concerned in accordance with given measurement orders, and the measurements carried out will be sent back to one or several fixed test units FTU very nearly in real-time. In the event of a dropped call, the mobile test unit MTU concerned will temporarily store the results in its own internal storage device, in order suitably to transfer these at a later time. Each of the mobile test units MTU may suitably be built as an integrated unit comprising a micro computer, a test mobile, a positioning system, e.g. GPS, as well as communications equipment. By using appropriately so-called PSMCIA-based storage, each of the mobile test units can easily be up-graded with new software versions without the support of a programmer. The complete mobile test unit MTU may thus suitably be built into a small house, facilitating easy installation in a vessel/vehicle.

Also shown in FIG. 1 is a configuration station CS whose task it is to maintain the database management system DBMS and the GIS system resources existing in the system. Via a user-friendly interface the operator may define resources for measurement both with regard to the database management system DBMS and the said GIS system. This entails that the operator may determine how data collected from the field units comprising the mobile test units MTU and the fixed test units FTU are to be handled. The main tasks having been given to the configuration station CS are to:

administer how measurements are to be grouped relative to time, location and user's identification,
administer map information for a geographical information system, the GIS system,
define links between measurement results and geographical information,
define geographical areas used in ordering presentations of measurements and results,
leave out or store as back-up old measurement results in order to release space in a database management system DBMS.

The implementation of the configuration station CS may suitably be done in a standard Windows configuration, and may be used in the data network TCP/IP for access to the collectively shared resources in the database management system DBMS. As is the case with the front end FE, various access rights may be granted or refused to specific users.

Figure 2:
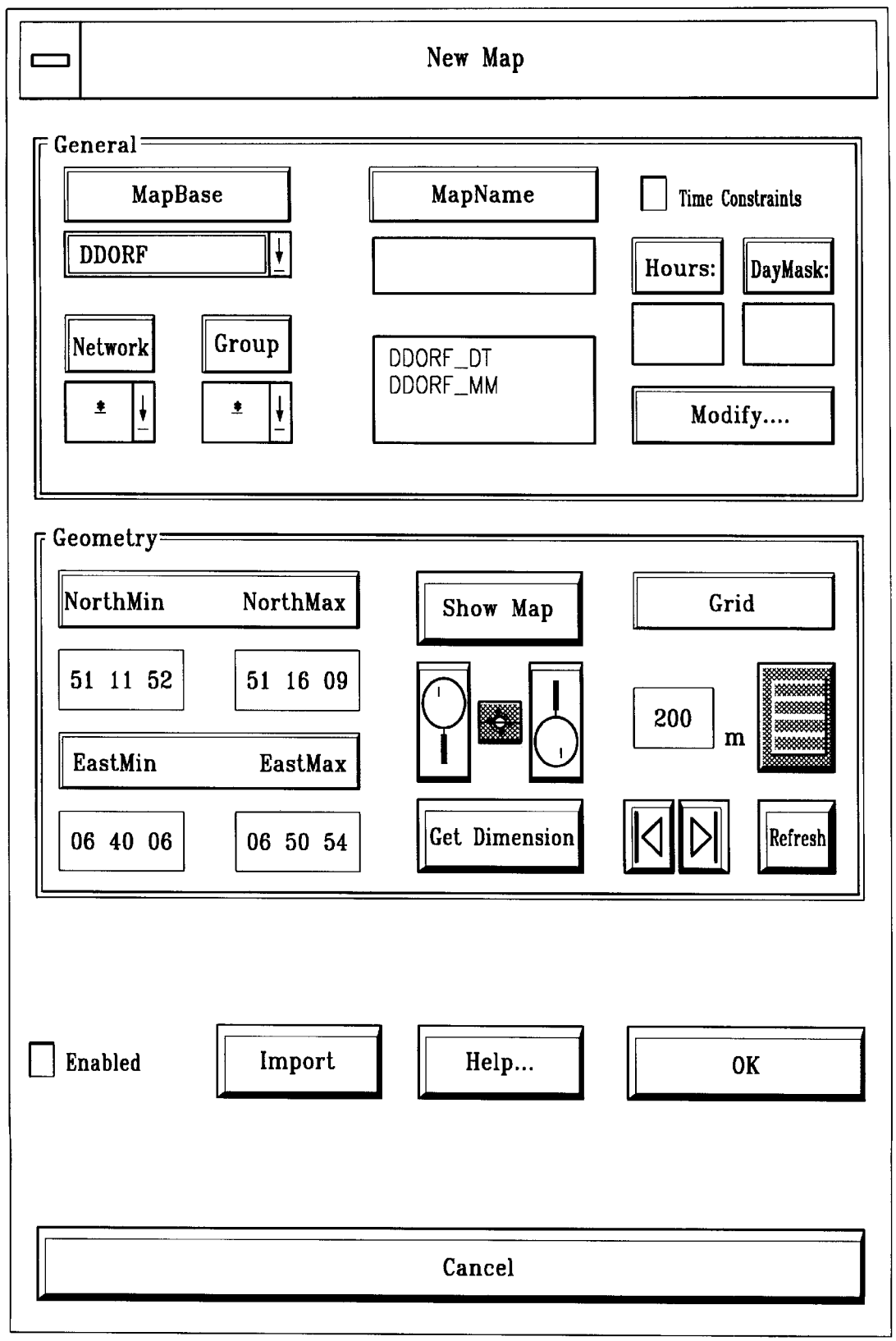
FIG. 2 shows an interaction image for a configuration station being part of the system according to FIG. 1.

One example of a screen image related to a configuration station CS is shown in FIG. 2, the said interaction image being related to the creation of a new map, related to the GIS system concerned.

Moreover, shown in FIG. 1 is a presentation station PS which constitutes the operator's tool for presentation of the collected measurements. By means of a geographical information system and a spreadsheet system, the user will have the possibility of viewing the results in different formats. The presentation station PS allows visualisation of data collected through the database management station DBMS, presented both as conversation oriented and as statistically oriented. The main operations allocated to the presentation station PS are:

to make it possible for the user to select and present individual conversations (one measurement order carried out from set-up of the call until shut-down) which focuses on each individual measurement and incident during the conversation, to make it possible for the user to select and present statistical overviews of the collected measurements, enabling one to group measurements according to time, location and size, the statistical overviews giving measurement results as properties of the location and the network parameters, rather than as properties of individual conversations.

to procure detailed tabulated presentations of data related to route outlines and statistical overviews, enabling the user to emphasise and study details of the GIS presentations, to enable the user to draw up and to procure reports from the statistical data in the database management system DBMS.

By procuring report templates with pre-selected topics, and restrictions based on the resulting data, the user will readily be able to procure reports, all the functionalities of the presentation station PS being suitably integrated in a "Windows" platform, as standard "Windows" applications are used. For geographically oriented presentations, a geographical information system is used at the presentation station PS, which is fully controlled by the presentation station PS. This entails that a presentation is provided of the measurement results related to the geographical position, either as single conversations or statistical data, and then as a fully integrated part of the presentation station PS, entailing that it is not required for another sub-system to be started, with its own set of commands and terminology. It should be understood that in the presentation station PS a suitably user-friendly report generator exists, affording the user the possibility of selecting the results which are of interest, and to set the criteria of the basis for a report. The report generator of the presentation station PS may be associated with the use of an integrated "EXCEL" spreadsheet for composing or editing the reports.

The said database management system DBMS may be referred to as the focal point for all information in the said CeNA system. The database management system will hold all permanent information in the system, comprising among other things:

definitions of areas which are being used in setting measurement orders and presentation of information, system component parameters for all components, e.g. comprising fixed test units FTU, mobile test units MTU, etc., measurement orders which are permanently stored in the database management system DBMS for subsequent repeated use or change, storage of all individual measurement results from fixed test units FTU and mobile test units MTU in the database management system DBMS, results of statistical data from analyses concerning the measurement results.

It should be understood that all relevant data are stored in the said database management system DBMS, be it data relating to the configuration of the system components, set-up of measurement data, etc., as well as statistics about all mobile test units MTU and fixed test units FTU and also results from the network and the processed results therefrom, the system handling all data in a consistent manner, utilising the database management system as the preferred storage system which thus eliminates any intermediate formats visible to the user. The database management system is well structured, allowing the user to use pertaining information for applications different from those related to the set of tools associated with the actual network analysis of the cellular network. The open DBMS architecture also offers the user the option of combining the information in the DBMS with other external data sources and to establish links by means of common indices. The DBMS system may be chosen among most standardised database systems available in the market, in particular by using ODBC based technology.

The components mentioned as being part of the CeNA system communicate via standard communication networks based on TCP/IP, making a wide range of configuration solutions possible. The front end FE mentioned, the server CeNAS, fixed test units FTU and the presentation station PS may be geographically distributed and connected via the said network TCP/IP and the database management system DBMS. Because the said TCP/IP is supported by a large variety of base networks it is possible to interconnect components via LAN, WAN, fixed dial-up lines or ISDN. The communication between the mobile test units MTU and fixed test units FTU is implemented via a special modem.

Description of Functions

The main functions in the system described, mentioned in connection with FIG. 1, may be listed as follows:

measurement preparations comprising definition of components and allocation of system resources, handling of orders with setting-up of measurement order effectuating orders, comprising transmission of measurement orders to FTU and MTU, measurement phase in which FTU and MTU carry out measurements and logging and also transmission of results back to server CeNAS, handling of results in which results are received, analysed, and stored in DBMS.

presentation of results where the operator may be given an overview of results and generate reports.

With reference to FIGS. 3 and 4 which show different interactive screen images, further details of the preparations for measurement will be described in detail.

Before a system can be put into operation, all system components must be defined, this work being performed at the time of setting-up the system, or when system components are introduced or re-configured, this work being carried out from the front end FE, see FIG. 1. The operator will then define parameters for the fixed test units FTU and the mobile test units MTU concerned, and for the fixed test units FTU that may include the parameters:

Name of FTU, comprising a symbolic reference to the FTU concerned,

FTU network address subscriber numbers in the FTU concerned geographical position for the FTU.

Where the mobile test units MTU are concerned, parameters will also here be set up at the front end FE, and will suitably comprise:

MTU name for identification

MTU home area, identifying where the MTU normally operates, vehicle registration number and specification of the vessel/vehicle where the MTU concerned is installed.

MTU number of mounting, entailing a unique identifier for the said MTU within the relevant CeNA system, being associated with the identification of hardware for the particular PS.

MTU subscriber number, each MTU being capable of comprising more than one subscriber numbers arranged via one or several selectable SIM cards.

The CeNA system mentioned will also utilise certain named system resources for setting-up orders and for analysis of the measurement results collected. The definitions of areas is used both where setting up orders is concerned, as well as effectuating of orders and in the presentation, while map sheet are used in analysing and in presentations.

With regard to definitions of areas, the CeNA system will typically work with sub-areas within a measurement area where measurings are performed. These are referred to as geographical areas, and this division is used in order that the operator may be able to carry out differentiated measurings within various sub-areas. For instance, certain problem areas may be given priority higher than where the mobile network functions without problems. The geographical areas are created randomly as polygons which will in turn be defined and named by the operator and also stored in the database management system DBMS for subsequent reference. The geographical areas are defined from the configuration station CS and may either interactively be defined via the GIS system, or be imported from external tables to the DBMS definitions. The geographical areas may also later on be used during presentations in restricting the result areas presented.

The CeNA system described offers a multitude of ways in which the collected measurement results may be viewed and analysed. Measurements recently made or conversations between mobile test units MTU and fixed test units FTU and the operator may be retrieved individually and inspected in every minute detail, while the user for instance monitors correspondingly movements of the mobile test unit MTU, the way this is illustrated in FIGS. 7 and 9, this being presented on the user's screen by means of a supporting GIS application. Selected conversations which have taken place may be forwarded e.g. to a collector being responsible for merging and distributing data from individual MTU sessions to various DBMS tables thus building and maintaining the background material employed in subsequent generating of long-term statistical presentation.

This will in actual fact entail a quantisation procedure, since an exact geographical position is being substituted by one or more parcels, comprising small rectangular regions, also referred to as a mesh, comprising the original. An exact point in time is substituted by one or several day periods spanning the original. Exact measurement data will, depending on the topic concerned, be substituted by accumulable quantities, comprising distribution, mean value, median value as well as standard deviation. Each parcel will comprise its own set of these accumulators, making it possible to collect results from a multitude of measuring sessions, and then to regard these results as properties of individual locations rather than random arbitrary events taking place during individual conversations.

It is expedient that the parcels are grouped together in what is referred to as map sheets. In principle, a map sheet is a random rectangular region, subdivided into a grid, to form uniformly shaped parcels. In addition to its geographical boundaries and mesh size, a map sheet will also possess some few properties which determine whether or not it will be affected by incoming measurements forwarded to the collector. Among other things, this will include:

identification of network operator; separate map sheets must exist for the various network operators to obviate that measurement data originating from completely different sources contribute to the same accumulators, and one map sheet should not be influenced by data procured from measurements in the network of another operator, time constrains; it is appropriate to make it possible to distinguish between measurement results collected during various periods in the day, as it is well known that a network may perform differently under peak load, e.g. at 3.00 p.m., local time, and provided a map sheet has a time constraint, it will only be affected by measurements procured during the said particular period of time, on/off; it will be possible to disable a map sheet for a certain period of time, or permanently, and if that is the case, the map sheet will not be affected by incoming measurement results, but it will still be possible to view its contents.

Map sheets may overlap, partially or completely, in respect of geometry and any time constrains. If the collector receives measurements emerged at a location which is covered by a multitude of sheets, these will all be affected, provided they contain a coordinated network operator identification, and that no other limiting constrains exist. Thus one single report from from a mobile test unit MTU will generally cause more than one accumulator to become updated.

The placement and the construction of map sheets entail that the operator is able to make decisions which will greatly affect the behaviour in the CeNA system mentioned earlier, at least as far as post-processing, storage and presentation of results are concerned. Implicitly, these decisions will determine the actual layout of the database management system DBMS, and as such they should be considered as the task which should only be performed by the administrator of the CeNA system. For this and similar reasons, the configuration station CS for the CeNA system concerned provides a highly user-friendly tool.

Moreover, the operator will be given great flexibility with regard to the description of measurement orders. Each order may be sent to a multitude of mobile test units MTU, and each single mobile test unit MTU may comprise a multitude of orders. When the MTU concerned has received a set of orders, they will be valid until receipt of a new set.

The definition of an order may comprise selecting the fixed test units FTU involved, and also the mobile test unit(s) MTU involved, setting of run-parameters, the measurement qualifiers MQ, as well as time parameters.

As far as the run-parameters are concerned, these may comprise:

idle time Rx measurements of level to be performed keep data for subsequent renewed attempts in the event that transfer to FTU failed reject measurement on insufficient GPS coverage GPS filter, selection between 2D and 3D navigating as a prerequisite for measurements being made.

When the "idle time Rx level measurements" is selected, the relevant mobile test unit MTU will log Rx level measurements also in an idle modus (not in conversation). These reports will temporarily be stored in the internal memory of the mobile test unit, and the mobile test unit MTU concerned will call a designated fixed test unit FTU for the purpose of updating results at regular intervals. Normally, it will be possible to use the "keep data" option, ensuring that the MTU will retain measurement results for subsequent renewed transfer in case one updating of results fails. The option "reject measurements . . . " will ensure that no measurements are initiated when there is no GPS coverage, and that measurements in progress will be terminated if coverage drops out for an extended period of time.

Built into the present system are also so-called measurement qualifiers which specify the conditions for carrying out the respective measurements. It entails the following option:

at point in time, where measurements are made within intervals of a given duration between starting and stopping time, within area, where measurements are made when the mobile test unit MTU concerned enters one of the specified areas, these areas being specified from a geographical list of areas, on being triggered, where measurements commence when the mobile test unit MTU concerned receives from the specified base station BTS and/or carrier frequency, max. sampling within the area, this parameter restricting the number of samples being performed in an area (for the time period valid for this measurement order) to the defined number.

With the options "at point in time", "within area", and "on being triggered", these will suitably be evaluated as an and-operation, entailing that all qualifiers specified for a measurement order must be met for a call to be initiated. In order to ensure the best adaptation of a measurement order, however, the mobile test unit MTU concerned should always evaluate all measurement orders available and perhaps execute the most important orders compatible with relevant conditions.

It should be understood that the said time parameters may specify start and stop for a valid order period, intervals which define maximum measurement frequency, as well as the duration of the call.

It should be understood that the geographical area list which is being checked when the command "within area" appears, is very important in order for a measurement order to be initiated.

It should furthermore be understood that "on being triggered" entails a specification of the serviced cell BSiC concerned, and its pertaining channel frequency ARFCN which is being used as a condition for performing the measurement, which may mean that if the option "on being triggered" is selected, measurements will only be carried out provided the relevant mobile test unit MTU is being held firmly to a given pair of serviced cell and channel frequency, BSiC/ARFCN, at the time of evaluation.

It should furthermore be understood that modes for set-up of measurements may comprise commands for defining a new order, as well as definitions for redefining an existing order, and when a set of measurement orders have been complemented, they will be ready to be forwarded to the fixed test units FTU and the mobile test units MTU concerned.

It should furthermore be understood that setting up of orders for the fixed test units FTU is in many ways similar to that of the mobile test units but to a limited extent. Mainly, the user will specify the relevant FTU, the MTU(s) to be called, and time-related parameters.

Overview of Measurements Performed

When one set of measurement order is defined, the operator can select transmission of the orders to the various mobile test units, the said transmission being done via respective fixed test units FTU, and on receiving confirmation from the fixed test units FTU involved that the orders are new or are to be retained, FTU will start connecting up each defined MTU and transmit the correct order for each of these. On receipt of confirmation from the MTU concerned, a successful measurement order will be stated as having been transmitted, while if the transmission fails, the FTU concerned will repeat the transmission at fixed intervals.

The measurement phase will constitute a co-operating operation among the mobile test units MTU involved, the fixed test units FTU and the server CeNAS, entailing that if orders are being communicated, measurements will be made at the mobile test units, and the results sent back via the fixed test units to the server CeNAS to be stored in the database management system DBMS.

A measurement phase may comprise the following events:

Receipt of order: when the said MTU is called by the said FTU, the former will start receiving the measurement order and possibly replace any previous order, and thereby constitute the governing parameters for the said MTU until a new set of orders is received. The said MTU will store the measurement order in a local permanent store which allows renewed reading and start-up of execution of order following a system disconnection or an error in the said MTU to be made.

Measurement qualification: when a set of measurement orders has been established in the MTU, the latter will commence checking the orders for a measurement qualification, which entails that the respective MTU will check its position, its time and certain trigger parameters, e.g. the serviced cell BSiC and/or the frequency ARFCN for the serviced cell, and concerning adapted start of measurements.

Measurements made: when the FTU concerned has detected an order adaptation, it will commence the various measurements which may comprise:

i) Measuring response times: The MTU concerned starts by dialling the number of the subscriber in the FTU concerned and measuring time for setting up the conversation, while at the same time the response time is being logged.

ii) Measuring Rx level: the MTU concerned will execute and log measuring of the Rx level of the serving cell and the six strongest non-serving cells, and this information will comprise the Rx level, the serving cell concerned BSiC and pertaining carrier frequency for the serving and the six non-serving cells.

iii) Measuring the quality of the signal: quality of signal must be measured and logged, the said information comprising the quality of the signal as defined according to the GSM 0.5.08 for the serving cell frequency.

iv) Measuring the timing advance: measuring the timing advance for the serving cell frequency will be measured and logged.

v) Signalling information: the system will log layer-1 and layer-3 messages from GSM signalling, messages for both "up-link" and "down-link" being stored, but then relative to frame contents which may be found in other measurement results.

vi) Disconnected calls: Any disconnection, either while a call is being set up or of an established connection will be stored, and if disconnecting takes place while a call is being set up, the type of disconnection will subsequently be evaluated at the server CeNAS which will distinguish between two types of disconnecting while a call is being set up: 1) disconnecting because the CeNA-FTU was engaged, or 2) disconnecting because of system blocking (either GSM or PSTN).

vii) Handover information: the system will obtain all handovers taking place during a call or a conversation and the reason for the handover, see table 10.32 in GSM rec. 04.08, will be stored.

iix) Signal to Echo Noise Ratio: this ratio, referred to as S2ENR parameter, described unwanted echo, and the combination of this parameter, quality of signal, Rx quality, and Rx level for the serving cell, describe the quality for the call or the conversation experienced by the user.

ix) Measuring at idle time: the operator may specify a measurement order entailing that the MTU concerned will perform measurement at idle time, entailing that the said MTU does not claim access to the network. Only measurement of Rx level will then be performed, while e.g. sampling each 10th to 15th second is generated, after which the log will fill up after a while, and a dump call will be made to the fixed test unit FTU concerned.

x) Measuring calls: this measurement order will procure many more data compared with the said measurement at idle time, as a measurement is procured each time a new GPS position occurs, which may e.g. be every second. A measurement will always contain Rx level measurement, signal quality measurement, and measurement of timing advance. The said S2ENR will be present in the measurements at less frequent intervals. Layer-1 and layer-3 messages, handover information, time for setting up a call, and any disconnecting will exist in the measurements when occurring.

Transmission of Results

The relevant mobile test unit MTU will start transmission of results to the relevant fixed test unit FTU as soon as a conversation has been established via the said MTU modem. This means that the results will be transmitted simultaneously with new results being obtained or acquired. This entails a transmission of the result more or less in real time. The MTU concerned will, however, hold the line until all data from the measurements have been transferred, even if the parameter for duration of call issued by virtue of the measurement order has expired. This extra time in communication mode should only make up a tiny fraction of the duration of the conversation because of the said transmission done in more or less real time.

It is expedient that the communication protocol employed is adaptable with regard to speed. It means that the system will optimise the baud-rate. In case of poor conditions for data transmission, the rate will be reduced, while under good conditions, it will be possible to increase the rate.

Any unwanted disconnecting either while a call is being set up or during a conversation, will be logged and stored together with the result "not transferred" to the MTU disc for subsequent transfer, something which does not have to require large storage capacity in the said MTU.

Handling of Results

The server CeNAS previously mentioned is in the present embodiment responsible for handling the measurement results mentioned, i.e. those results received from the mobile test units MTU involved via the fixed test units FTU correspondingly involved and stored and being analysed in the said server. The result handling may be summarised as stated below:

Communication of results: upon receipt of measurement results from the said MTU and the said FTU, the incoming data will be "unpacked", the said test units then following a protocol set-up comprising a multitude of ACK and a multitude of NACK with incoming packages. In case a communications line should drop out due to a rejected connection, the mobile test unit MTU will keep the result and complement the result transaction at a later stage.

Storage of results: the server CeNAS will allocate transactions related to the database management system DBMS and commence storing of the result in the said DBMS system. On a successfully implemented completion, the server CeNAS will also complete the transaction, marking it as valid. If the transaction is not implemented in a completely successful manner, the fixed test unit/the server FTU/serv will add the missing result(s) when the mobile test unit MTU completes its transfer of the results.

Analysing the results: the operator may forward results from sessions with selected mobile test units MTU to the result collector in the said cellular network analyser CeNA, the collector, as mentioned above, being made up of a sub-device designed for this purpose.

It should be understood that for each single MTU report, all affected map sheets must be detected, based on the exact position of the MTU concerned at the time the measurement was made. Furthermore, updating must be done of the corresponding accumulators, the said updating being related to distribution of results, mean value, median value, and standard deviation. New accumulators will need to be created as required. This procedure is necessary in order that measurement results recently acquired may be able to contribute to network statistics procured and stored by the said CeNA system.

Presentation of Results

The presentation station mentioned, PS, see FIG. 1, is used in presenting of measurement results and in generating reports, the station extracting data from the database management station DBMS and presenting the data to the operator in various formats. It is expedient to present these data in two main modes:

GIS oriented presentation where the measurement data are presented in relation to geographical position, spreadsheet or mesh-oriented presentation where measurement data are shown in a spreadsheet, while shared geographical presentations, e.g. bars, pie charts and distribution curves are available.

The results may be studied in the following ways:

map overviews where the measurement results are being visualised on top of a map of the measurement area, grid overviews where the results are shown in a "grid" similar to a spreadsheet, chart overview where the results are shown as bar charts, line charts or pie charts.

What all these presentations have in common is that the operator may prepare criteria for the results to be retrieved. The selecting of criteria is done by choosing a topic, a symbol, and by setting the constraints, and whether this is available, type and form of presentation. When the selecting has been prepared, the system will present the data in the given manner.

The said map overview is used in viewing the results relating to a map of the measurement area. Two types of may views may exist, namely the static overview and the route overview. The static map view is being used in viewing the accumulated results from a variety of measurements, while the route map overview is used in viewing the results from one conversation.

To specify further, the static overview is selected for presentation of the contents of map sheets. As mentioned above, a map sheet will comprise a background map, a superimposed mesh, and a set of tables from the database management system DBMS. On starting the presentation station, the user will open one or several set(s) of map sheets, and these will constitute the basis for all static overview presentations performed in that session. To view the accumulated measurement results, a static monitoring selection is defined. Selecting a static overview comprises one or several selection layers. One layer is suitably defined as follows:

a theme defining the data to be presented, the said themes to be defined further below, a symbol defining how the data should be presented in the map, a constraint, limiting the data selected for presentation, the said limitations comprising the communicating cell BSiC, the relevant channel frequency ARFCN, geographical area, time spent, and identification of operator/user.

More particularly, the available themes may include:

Rx level,

Rx quality

Signal to Echo Noise Ratio

Handovers

Rate of setting up call.

Time to establish connection

Blocked calls

Rejected calls

Shown in FIG. 5 is an interaction image on a screen where e.g. the theme Rx level as performed by the mobile test unit MTU concerned may be viewed. Such an observation may be made in each grid of the map sheets, as the Rx level can be represented both the way it is viewed from the serving cell, whether BSiC or ARFCN, and the way it is viewed from any combination of BSiC/ARFCN. The other themes will be stored the way they are viewed from any BSiC and/or ARFCN, and viewed from the basis of the given combinations. All measurements are grouped in accordance with pre-defined boundaries, all being subject to bound rules for presentation.

In the screen image shown in FIG. 5, the symbols used for definition of the results can comprise various colour scales, but generally speaking, these symbols may comprise:

shadowing, where the cells are in shaded colours according to the values of the result, solid lines where the cells are filled-in in colour according to the values of the result, standard symbols where the cells have been given symbols indicating the value of the result.

The constraints which set the limit for selecting results for presentation may comprise as stated above BSiC, ARFCN, time, geographical area, and also operator identification, and it is possible for example, by using a constraint in a selection layer for "blocked calls" for a certain period of time, and another constraint in another layer with the same theme, to compare results from one or several periods against each other.

The system may usually be designed so that it is possible to obtain an overview of a variety of layers (usually up to two) in a static overview at the same time. when a static overview is created, the operator will be able to identify, by referring to an area of symbols, the measurement values for the meshes within the area concerned. By altering the themes, symbols and constraints, the operator may readily manipulate the static overviews, enabling him to view the collected results from different angles.

A selection aimed at a static overview may be named and stored for subsequent renewed use, and such sets of selected overviews may be stored in the database management system DBMS.

In FIG. 6 is shown a screen image where the static overview grid may be studied in further detail, based on the results in the meshes for the static overview. When the user calls the static overview grid, he will be given a tabular presentation of the field in the static overview meshes concerned. Based on this overview, the user may view the contents of each field in the database management system DBMS which is connected with the meshes, and by selection of the mesh configuration menu it will be possible to customise the contents and the set-up of the grid in accordance with the user's specifications. It is also possible to use constraints on the grid to limit the visible DBMS rows, or to display results distributed on BSiC and/or ARFCN.

To localise fields from the static overview, the user points to and clicks in the static overview map, and the system will then focus on the corresponding records in the grid, entailing a transition from the screen image according to FIG. 5, to the screen image according to FIG. 6, or alternatively from the screen image shown in FIG. 8 to the screen image shown in FIG. 6, and vice versa, and by clicking on a record in the grid, the system will highlight the corresponding mesh pattern in the static overview map, see FIG. 5 or FIG. 8.

Shown in FIGS. 7 and 9 are screen images which the operator will be able to obtain on his computer system when the operator calls up the function "route overview", which entails a visualisation of results of single conversations, from set-up of a call until disconnecting.

To create a selecting list for route overview, it will be possible for the operator to use the function "route list builder". The user may set parameters comprising identification of MTU, time of start and stop, original BSiC and ARFCN, and also to specify the events of which an overview is requested. Based on these systems, the system will present a list of "conversations" from which to select. A selected conversation will then be drawn in the route overview according to results measured along the route, see in particular the heavier line entered in FIGS. 7 and 9, and by choice among a set of available themes, and these may be accompanied by one or several events to be visualised.

In connection with a route map overview as shown in the FIGS. 7 and 9, the themes may suitably comprise:

Rx level

Rx quality

Time Advance and these themes may be drawn in by means of a colour code or a shading code in accordance with relevant values along the said route.

The events which may suitably be associated with a route map overview are as follows:

Handover, symbolising handover failure or complete

Connection, symbolising where connection established

Blocked call

Rejected call

Signal to Echo Noise Ratio, symbolising a signal to echo NR level

By a combination of themes and events for given conversations, the user may visualise one or several routes simultaneously. It is possible to focus on one or several individual conversations, or to adapt the system to focus on the complete set of conversations.

In other words, the route overview grid is being used to study the measurement results for each sampling along a route overview conversation in further detail. When the route overview grid has been launched, the user will have a tabular presentation of the representation fields for each measurement sampling.

Using the route overview grid as a point of departure, the user may inspect the content of each field in the database management system DBMS for each conversation. By selecting the grid configuration menu, it will be possible to customise the content and the set-up of the grid in accordance with the wish of the user. To localise fields from the static overview it is possible to point to and click into the route overview map, and the system will then focus on corresponding records in the grid. And vice versa by clicking on a record in the grid, the system will highlight the corresponding "sampling" in the route over-view map.

It should be understood that the system is also able to present the measurement results collected in the form of chart overviews, mainly graphic views of the grid overview. A screen image with one such graphic representation is shown in FIG. 10, but it should be understood that the operator may change the type of diagram and proportions of the representation in various ways, depending on the way in which it is most appropriate to present the data from the grid overview. In FIG. 10 is shown an example where the grid overview shows measurements of Rx level in a multitude of serving cells BSiC and a multitude of frequencies ARFCN, the screen image of FIG. 10 being capable of showing the result in a Z-grouped bar chart with the Rx level along the Y-axis, the BSiC concerned along the X-axis, and frequencies along the X-axis. The chart overview will show the data of the grid overview in a system defined format at normalisation, and make it possible for the operator to change the presentation in accordance with own wishes.

Reporting

When the user/operator has an interesting set of maps, grids and chart overviews, the user will normally prepare a report. The report may be drawn up in many different ways, possibly using features related to Windows, as well as others by chosing in accordance with the presentation station of the system, PS.

One initial alternative is a so-called map report which may be taken out directly on a printing device, exported to the clipboard or to a file to be included in a document created in a standard Windows package. Typical applications where map reports of the monitored cellular network may be included are Designer, Ami-Pro, MS-Word. It is also possible to import data from other Windows-applications into the map overview to produce a better report. Examples of applications may comprise Designer, Coral Draw, or a report termed Excel Spreadsheet, see further details below.

It is possible to use a grid overview and/or chart overview to obtain a report. The operator designs the grid overview and the chart overview as desired, and selects the choice wanted with regard to report format. The presentation station PS will then export the grid overview and the program overview into a report of the Excel Spreadsheet type, start up the said Excel Spreadsheet, and display the finished report. The spreadsheet reports may subsequently be stored for later use, or be used in conjunction with any other Excel spreadsheets, even in places where a CeNA system according to the invention is not installed. The said Excel spreadsheet report may also be entered in the map overview prior to print-out in order thus to provide a more informative report.

It should be understood that the system according to the present invention may also comprise a report builder which allows drafting of "customised" reports, for instance in Excel. Both the format and the contents of the report may be determined by the user. A set-up menu, based on familiar network concepts, which is easy to use, can be procured in order to help the user make appropriate decisions, and with a tool as stated, advanced Excel reports may be generated, even if the user has no previous knowledge of Excel.

The main choices which may be available in a report builder for retrieval of data may comprise:
 theme (Rx level, Rx quality, rate of setting up calls etc.)
 how the data are to be inspected (e.g. as mean value, median value, degree of implementability etc.)
 "first level" constraint, which specifies the main grouping of the data (e.g. according to cell or to geographical area)
 "second level" constraint (e.g. operator identification, time, BSiC, ARFCN), as this allows further grouping of data and also provision of a new dimension in the table.

The main choices of format of the report may comprise:
 type of report (a regular spreadsheet table, an interactive "Pivot Table" etc.)
 type of graph (pie chart, 3D bar chart etc.)
 format of number values (e.g. % of a total)

In addition to providing tables and graphs via existing data, the user may perform various types of statistical analyses on the data selected. A correlation tool may, for instance, be used to examine for a possible relation between measurements concerning Rx level and Rx quality.

The report may be stored as a new, independent report, or it may be added as one or more pages to an already existing report. It is also possible to store the report template in order to use it as a shell when procuring new reports.

It should be understood that also static reports may be procured, comprising the absolute values of measurements and reflecting the database management system DBMS at the time when the report was created. The report may be exported to any station and need not be associated with the database management system DBMS.

It shall furthermore be understood that also a dynamic report may be chosen, and that such a report, rather than holding the relevant DBMS values, places weight on the corresponding DBMS annotations and when loading, extracts the updated values from the said DBMS. This option is being used in creating periodic reports for a certain interesting subject such as e.g. rejected calls within various cells.

In other words, according to the invention a description is given for a system for monitoring telephone networks, in particular cellular networks, based on robots being sent out and into the measurements area, e.g. in vessels/vehicles of private or public type. The said robots have been programmed to receive instructions with specific orders for observation of the quality of parameters which reflect the quality of the services performed in the geographical area concerned which may be covered by one or several cells, and one or several associated base stations. It should be understood that the system may be used chiefly for digital networks, but may also be used for analogous networks or a combination of these by sending out a suitable number of robots programmed accordingly.

On the basis of the results communicated by the robots back to their associated base stations and associated main centre, in particular to an open database with suitable user access, the owner of the network will quickly be able to obtain real-time based and statistical data of the quality in the network in order then to take steps to improve it. This may e.g. comprise observation of a base station being poorly or wrongly placed, the possible need for placing out more base stations for improved coverage. Alternatively, the observations may comprise good connection to the base station, but lack of channels between the base station and its associated main centre which should entail upgrading the network to several channels in the area concerned.

Furthermore it may be observed with the system according to the invention the real number of handovers from base station to base station along a certain route, as well as the number of successfully completed hand-overs etc.

The said robots or mobile test units may be designed approximately resembling a mobile telephone, without a particular power supply, enabling the individual units to take up very little space, and naturally being programmable within a variety of possibilities.

The appendix enclosed contains an outline of components and component specifications which may be part of an embodiment of the present invention.

---
APPENDIX
---

CeNA Front-End (FE):

System component definitions, measurement ordering and system status surveillance.
HW-requirements:

33 MHz 486 or better
8 Mb of RAM
Minimum 20 Mb of free disk space
SW-requirements:

MS Windows 3.1 or later
MS DOS 6.0 or later
CeNA Configuration Station (CS):

Map-sheet definitions and handling. Definition of geographical areas. Storage handling, back-up and disposal of old data.
HW-requirements:

33 MHz 486 or better
8 Mb of RAM
Minimum 20 Mb of free disk space
SW-requirements:

MS Windows 3.1 or later
MS DOS 6.0 or later
CeNA Presentation Station (PS):

Result presentation and report building.
HW-requirements:

66 MHz 486 or better
12 Mb of RAM
Minimum 20 Mb of free disk space
SW-requirements:

MS Windows 3.1 or later
MS DOS 6.0 or later
Graphics 1280 x 1024 with 256 colourdrive
CeNA Server (CeNAS):

Handle outgoing and incoming DBMS traffic to FTUs. System statistics.
HW-requirements:

HP-700 series workstation, or 800 series Server
Sufficient RAM and disk capacity
SW-requirements:

HP/UX 9.0 or later
Sybase ..,.. or
-other DBMS system may be used upon request
CeNA Fixed Test Unit (FTU):

Performing measurement. Make calls to MTUs. Receive calls from MTUs.
Hardware configuration:

| CPU: | Intel 486 50 MHz DX2 |
| --- | --- |
| Memory: | 4 MB upgradable to 16 MB |
| Storage: | 58 MB disk, upgradable to 500 MB |
| PSTN lines: | 5 lines upgradable to 20 |
| Extern comms: | Ethernet interface |

Software configuration:

Built self-test and runtime software.
Upgradable by download from CeNA Server.
CeNA Mobile Test Unit (MTU):

Performing measurement. Make calls to FTUs. Receive calls from FTUs.

---
-continued
---
APPENDIX
---

Hardware configuration:

| CPU: | Intel 386 33 MHz SX |
| --- | --- |
| Memory: | 1 MB, upgradable |
| Storage: | 1MB PCMCIA disk, upgradable to 100 MB |
| Test MS: | Built in Orbitel 901 Test MS |
| Modem: | Built in . . . modem |
| Navigation: | Built in Rockwell . . . GPS, |
| Dead reckoning: | Optionally connection for . . . DR system |
| Extern comms: | Serial line for external connection. |

Software configuration:

Built self-test and runtime software.
Upgradable by change of PCMCIA card.

---

We claim:

1. A system for monitoring telephone networks and/or data communication networks, especially cellular mobile telephone networks, the system including a plurality of base stations equipped with a transmitter and a receiver as well as a plurality of mobile units with equipment for communicating with at least one of said plurality of base stations, the system comprising:

an operator of a network;

at least one fixed and/or mobile unit, said at least one fixed and/or mobile unit configured for making at least one observation of quality, and said at least one fixed and/or mobile unit configured for engaging in a communication with said operator, said communication between said at least one fixed and/or mobile unit and said operator occurring via said network;

a database wherein data relating to observations of quality from said at least one fixed and/or mobile unit are stored and processed;

a data processor, said data processor configured so as to be controllable by said operator;

wherein said database is accessed by said data processor to retrieve at least part of said data relating to observations of quality that have been received and stored, the accessing allowing an analysis of larger or smaller geographical areas, as well as smaller sub-areas and regions thereof, a geographical position being further definable by smaller mesh-shaped parcels; and wherein the system further comprises a plurality of fixed and/or mobile units, said at least one fixed and/or mobile unit being one of said plurality of fixed and/or mobile units, said plurality of mobile units having quality observation organs that are equipped to make at least one measurement pertaining to at least one element of the group comprising a reception level, a reception quality, a signal to echo noise ratio, handovers, a time for establishing a connection, a rate of call set-up, blocked calls, failed calls, and failed handovers;

said quality observation organs also equipped for storing, updating, and transmitting said at least one measurement via said plurality of fixed units.

2. The system of claim 1, wherein said parcels are grouped together as map sheets that are sub-divided by a grid.

3. The system of claim 1, wherein:

said at least one fixed and/or mobile unit further comprises a plurality of fixed units that are arranged in a geographical pattern; and said at least one fixed and/or mobile unit further comprises a plurality of mobile test units that are mounted in vessels and/or vehicles that move about in said network.

4. The system of claim 1, wherein said communication occurs by at least one of reporting during certain intervals of time or temporary local logging of analysis data for subsequent communication.

5. The system of claim 1, wherein the system further comprises an interface between said operator and said plurality of fixed and/or mobile units, said interface allowing said quality observation organs in individual units of said plurality of fixed and/or mobile units to observe quality as determined in accordance with particular requirements from said operator.

6. The system of claim 1, wherein said database comprises an open database that communicates with other similar open databases.

7. The system of claim 1, wherein said at least one fixed and/or mobile unit can communicate with said operator via an open network and the system communicates via said open network as well.

8. The system of claim 1, wherein said plurality of mobile units being in communication with said plurality of fixed units, and wherein said plurality of mobile units have said quality observation organs, said quality observation organs comprising at least one of a built-in micro computer, a test mobile, a positioning system, and a communication equipment.

9. The system of claim 1, wherein said plurality of fixed units communicating with said plurality of mobile units via a special modem and via a cellular telephone network, and said plurality of fixed units communicating with said operator via an open network.

10. The system of claim 1, wherein said plurality of mobile units equipped to receive changes in observation programming or measurement ordering and to store temporarily said observations of quality in a personal store of each of said plurality of mobile units, said plurality of mobile units equipped as well with said quality observation organs for communication of said observations of quality to said operator via said plurality of fixed units.

11. The system of claim 1, wherein said at least one fixed and/or mobile unit can communicate with said operator via a substantially open network, and said substantially open network (TCP/IP) enables connection of components via at least one of a local area network (LAN), a wide area network (WAN), an integrated services digital network (ISDN), fixed lines, and dial-up lines.

12. The system of claim 1, wherein at least one of said plurality of mobile units being arranged in a private car, a service car, a bus or coach, a tram or train; and wherein said at least one of said plurality of mobile units being arranged for unattended, automatic operation; and wherein said at least one of said plurality of mobile units is configured for performing functions of a mobile telephone in addition to performing said observations of quality of said quality observation organs and doing so without a particular power supply.

13. The system of claim 1, wherein the system may be applied to analog networks, digital networks, and/or networks comprising wholly or in part a combination of analog and digital aspects.

14. The system of claim 1, wherein said at least one fixed and/or mobile unit can communicate with said operator via an open network, said operator being in an operations center.

15. The system of claim 1, wherein said communication between said at least one unit and said operator occurs virtually in real-time.

16. The system of claim 1, wherein said database is an open database and said data relating to observations of quality is for analyzing and for graphical presentation of the quality of said network in selected geographical areas, for accumulating statistics, and for transporting of information to other applications.

17. The system of claim 1, wherein said operator establishes requirements for making said observations of quality based on at least one of a basic setting, a report interval, a maintenance schedule, and access level.

18. A system for monitoring telephone networks and/or data communication networks, especially cellular mobile telephone networks, the system including a plurality of base stations equipped with a transmitter and a receiver as well as a plurality of mobile units with equipment for communicating with at least one of said plurality of base stations, the system comprising;

an operator of a network;

at least one fixed and/or mobile unit, said at least one fixed and/or mobile unit configured for making at least one observation of quality, and said at least one fixed and/or mobile unit configured for engaging in a communication with said operator, said communication between said at least one fixed and/or mobile unit and said operator occurring via said network;

a database wherein data relating to observations of quality from said at least one fixed and/or mobile unit are stored and processed;

a data processor, said data processor configured so as to be controllable by said operator;

wherein said database is accessed by said data processor to retrieve at least part of said data relating to observations of quality that have been received and stored, the accessing allowing an analysis of larger or smaller geographical areas, as well as smaller sub-areas and regions thereof, a geographical position being further definable by smaller mesh-shaped parcels;

wherein said observations of quality comprise quality observation measurements that are presented for visualized inspection in at least one form selected from the group comprising map sheets, either as statistical overviews of accumulated measurements or as a route overview for a mobile conversation: a grid overview; and a chart overview; and wherein a presentation in the form of a route overview includes a built-up route list, said built-up route list comprising at least one element selected from the group comprising identification of a selected mobile unit with associated identification; time for starting and stopping; original cell and cellular network; available themes, including at least one of a reception level, a reception quality, and a time schedule; events that are to be part of the analysis, including at least one of completed or noncompleted handovers, establishment of a connection, blocked call, rejected call, and signal to echo noise ratio; and the presentation being shown in legible symbols.

* * * * *

UNITED STATES PATENT AND TRADEMARK OFFICE
CERTIFICATE OF CORRECTION

PATENT NO.     : 5,987,306
DATED          : November 16, 1999
INVENTOR(S)    : Nilsen, et al.

It is certified that error appears in the above-identified patent and that said Letters Patent is hereby corrected as shown below:

Column 7,
Line 36, replace "The-report" with -- The report --

Column 8,
Line 66, replace "numbers" with -- number, --

Column 10,
Line 18, replace "from from" with -- from --

Column 14,
Line 48, replace "may" with -- map --

Column 15,
Line 50, replace "time. when" with -- time. When --

Column 16,
Line 37, replace "Advance and" with -- Advance NEW PARAGRAPH and --

Column 19,
Line 57, replace "58 MB" with -- 50 MB --

Signed and Sealed this

Thirtieth Day of October, 2001

*Attest:*

NICHOLAS P. GODICI
*Attesting Officer*     Acting Director of the United States Patent and Trademark Office